United States Patent
Lee

(10) Patent No.: US 11,256,266 B2
(45) Date of Patent: Feb. 22, 2022

(54) METHOD OF CONTROLLING CART ROBOT IN MOVEMENT RESTRICTED AREA AND CART ROBOT FOR IMPLEMENTING THE SAME

(71) Applicant: LG ELECTRONICS INC., Seoul (KR)

(72) Inventor: Dongeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 237 days.

(21) Appl. No.: 16/547,232

(22) Filed: Aug. 21, 2019

(65) Prior Publication Data
US 2019/0377357 A1    Dec. 12, 2019

(30) Foreign Application Priority Data
Jul. 18, 2019    (KR) .......................... 10-2019-0087087

(51) Int. Cl.
*G05D 1/00* (2006.01)
*G05D 1/02* (2020.01)

(52) U.S. Cl.
CPC ......... *G05D 1/0238* (2013.01); *G05D 1/0088* (2013.01); *G05D 1/0214* (2013.01); *G05D 1/0225* (2013.01); *G05D 1/0242* (2013.01); *G05D 1/0253* (2013.01); *G05D 2201/0216* (2013.01)

(58) Field of Classification Search
None
See application file for complete search history.

(56) References Cited

U.S. PATENT DOCUMENTS

| | | | |
|---|---|---|---|
| 10,710,633 B2* | 7/2020 | Carlson | G05D 1/0274 |
| 2013/0218344 A1* | 8/2013 | Teng | A47L 11/4061 700/259 |
| 2013/0325244 A1* | 12/2013 | Wang | G06T 11/00 701/26 |
| 2017/0108860 A1* | 4/2017 | Doane | G01C 21/20 |
| 2017/0212511 A1 | 7/2017 | Paiva Ferreira et al. | |
| 2019/0210849 A1* | 7/2019 | High | B60P 3/06 |
| 2020/0047337 A1* | 2/2020 | Williams | B25J 9/163 |
| 2020/0053325 A1* | 2/2020 | Deyle | G01C 21/206 |
| 2020/0249688 A1* | 8/2020 | Caussy | G05D 1/0225 |
| 2020/0257293 A1* | 8/2020 | Kanno | B62B 5/0069 |

FOREIGN PATENT DOCUMENTS

| | | |
|---|---|---|
| KR | 10-2011-0119438 A | 11/2011 |
| KR | 10-2017-0041166 A | 4/2017 |
| KR | 10-1787428 B1 | 10/2017 |
| KR | 10-2018-0087768 A | 8/2018 |

* cited by examiner

*Primary Examiner* — James M McPherson
(74) *Attorney, Agent, or Firm* — Birch, Stewart, Kolasch & Birch, LLP

(57) ABSTRACT

The present invention relates to a method of controlling a cart robot in a movement restricted area and a cart robot for implementing the same. A cart robot which controls movement thereof in a movement restricted area according to an embodiment of the present invention includes a positioning sensor configured to receive a signal from a transmission module, a movement unit configured to move the cart robot, and a controller configured to control the movement unit to park the cart robot around the movement restricted area when the positioning sensor receives data for notifying that the cart robot enters the movement restricted area from the transmission module.

19 Claims, 17 Drawing Sheets

FIG. 5
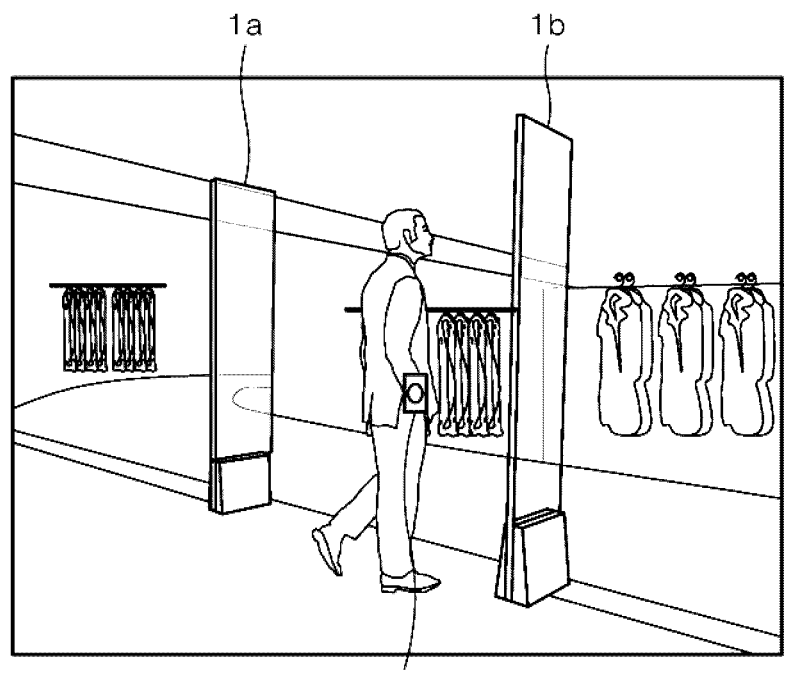
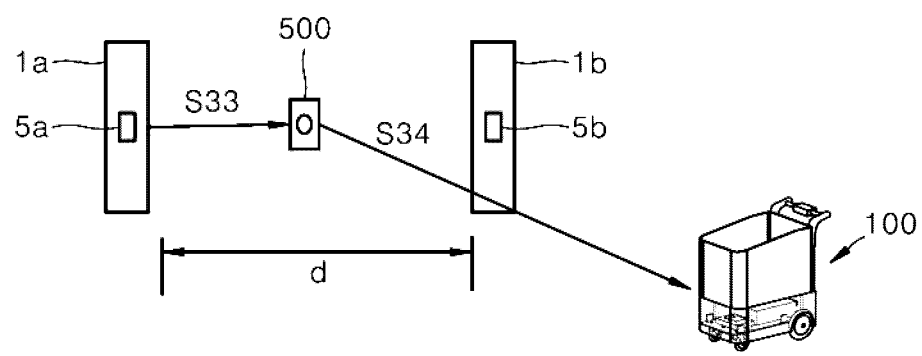

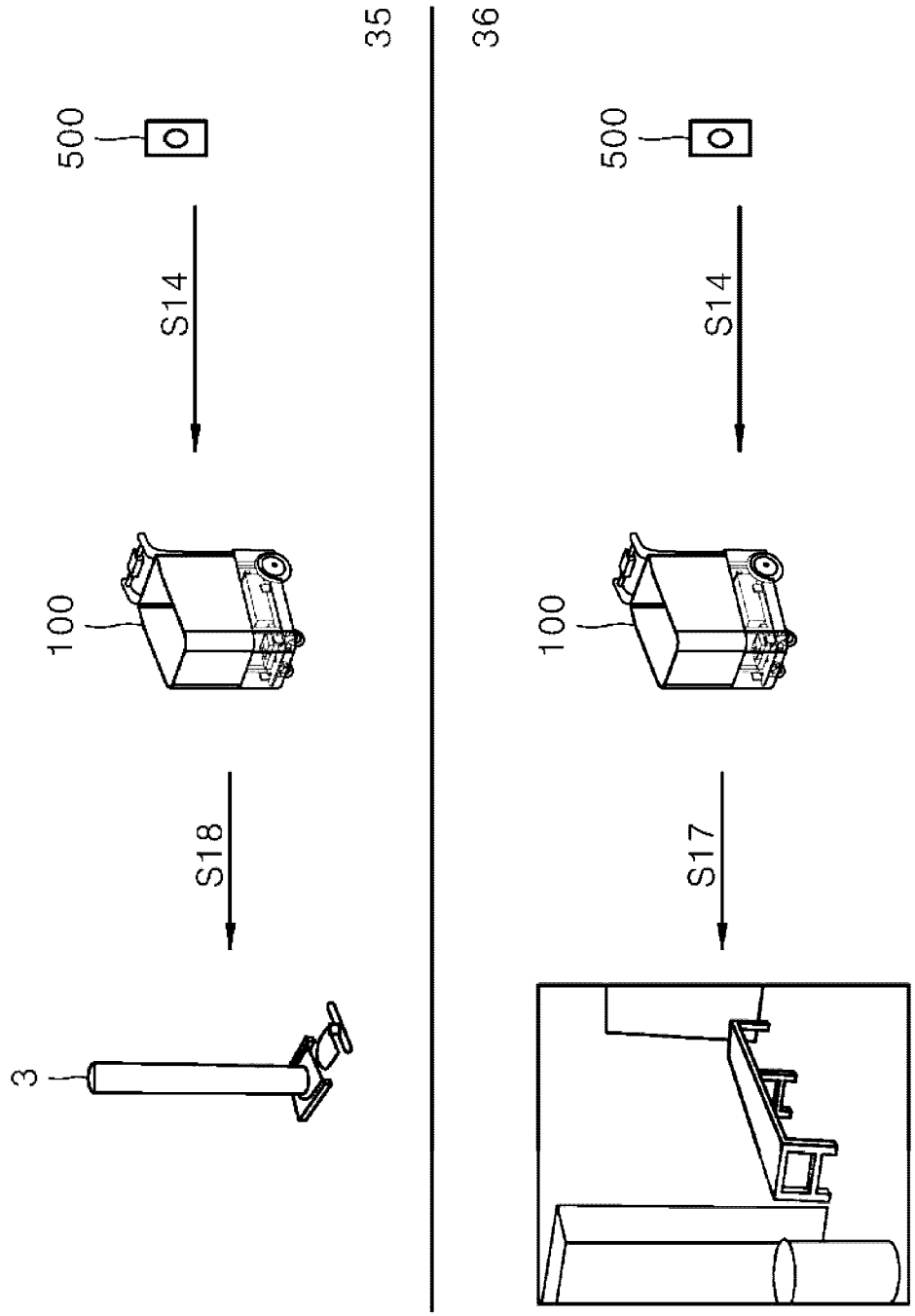

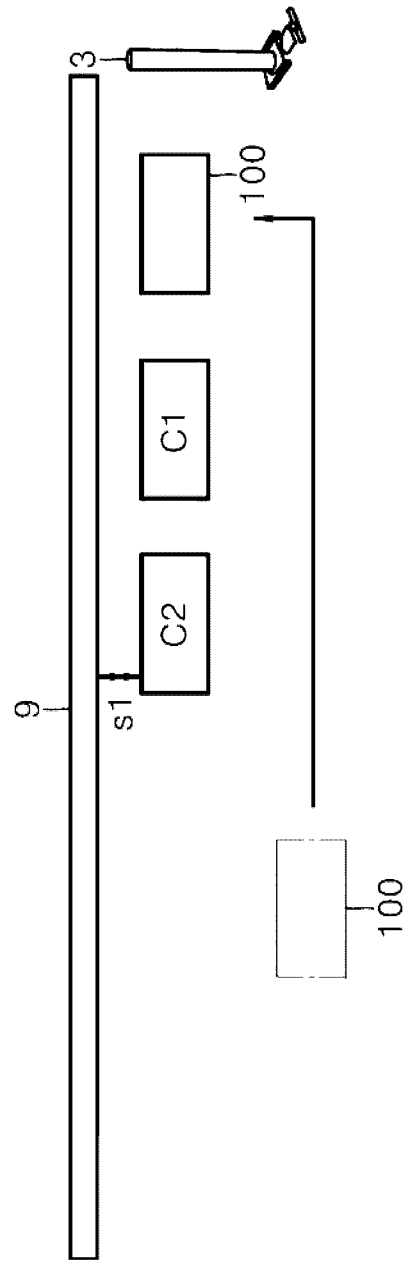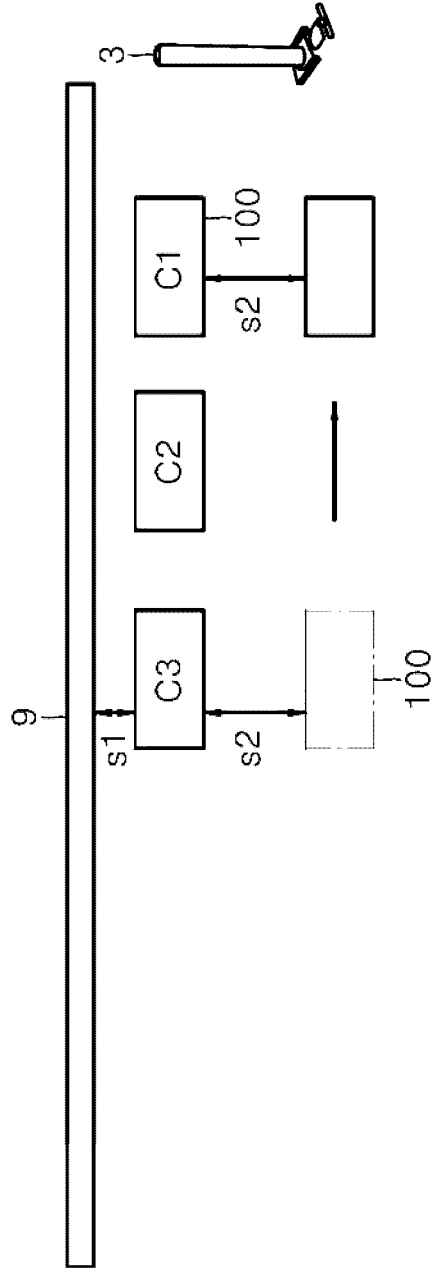

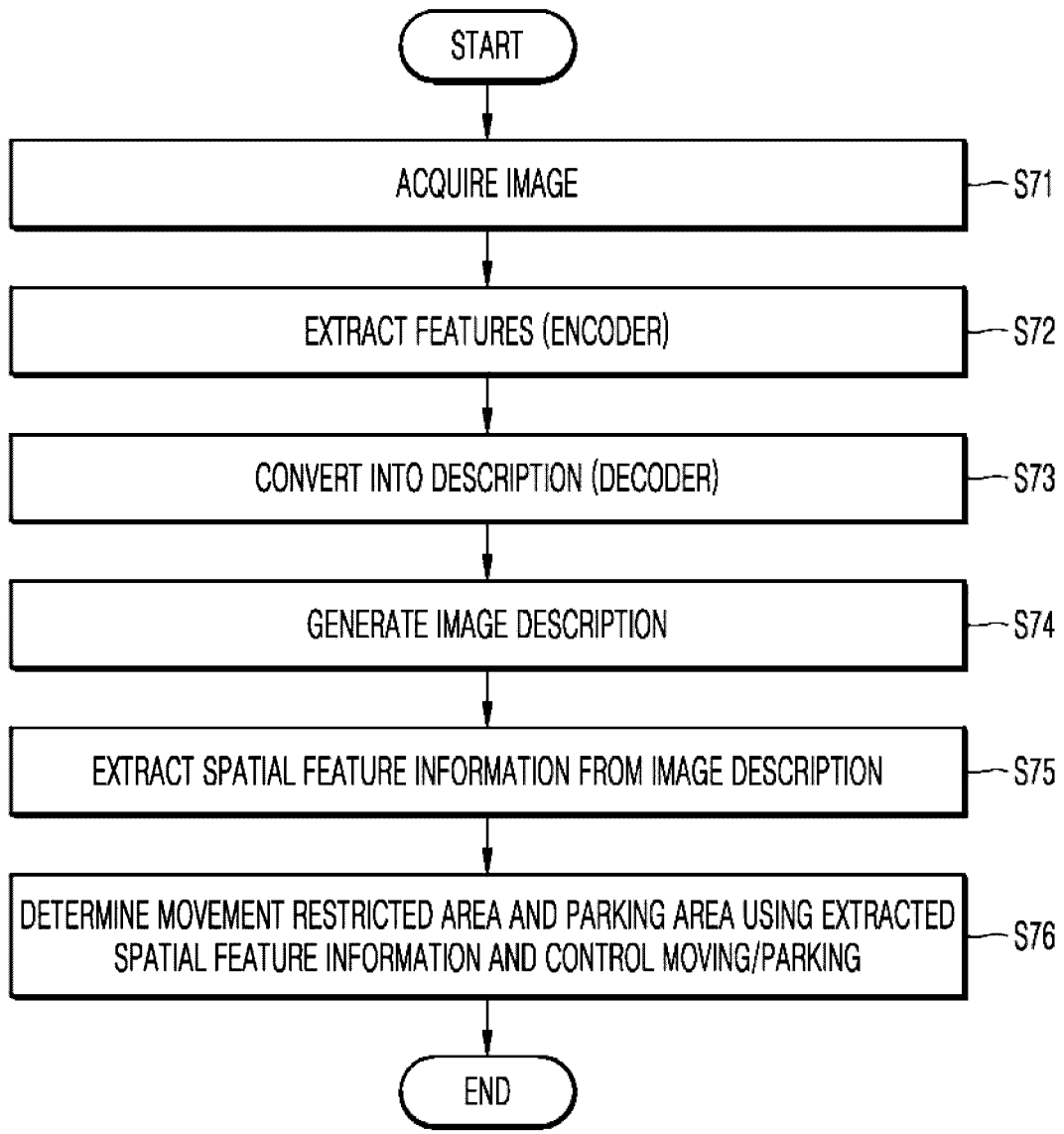

METHOD OF CONTROLLING CART ROBOT IN MOVEMENT RESTRICTED AREA AND CART ROBOT FOR IMPLEMENTING THE SAME

CROSS-REFERENCE TO RELATED APPLICATION

The present invention claims priority under 35 U.S.C. § 119 to Korean Patent Application No. 10-2019-0087087 filed on Jul. 18, 2019 the entire content of which is incorporated herein by reference.

BACKGROUND

1. Field of the Invention

The present invention relates to a method of controlling a cart robot in a movement restricted area and a cart robot which implements the same.

2. Discussion of Related Art

Various people move by carrying various objects in large spaces such as supermarkets, department stores, airports, and golf courses, wherein human and material exchanges actively occur. In this case, in order to provide user convenience, devices such as carts may assist a user in moving objects.

Conventionally, a user has directly handled and moved a cart. However, due to the dead load of the cart and various articles loaded on the cart, there is a growing need for a cart that is provided with an electric power source and is moved based on control of a user. Alternatively, there is a need for technology for allowing a cart to autonomously move to follow a user.

An autonomous operation of a cart includes an operation of coping with various situations. For example, when a user moves by leaving a cart for a moment, the cart should determine whether to follow the user or wait and then should perform an autonomous operation according to determination results. Accordingly, a method will be described in which a cart performs an operation necessary for a space by reflecting various special features of the space in which the cart is disposed.

SUMMARY OF THE INVENTION

The present invention is directed to providing technologies in which a cart robot confirms whether a user has entered a movement restriction area.

In addition, the present invention is directed to providing technologies for confirming whether a user moves using a radio frequency (RF) gate provided for theft prevention.

Furthermore, the present invention is directed to providing technologies in which a cart robot moves to a parking area around a movement restricted area and is temporarily parked in the parking area, thereby reducing complexity of a space.

The objects of the present invention are not limited to the aforementioned objects. Therefore, other objects and advantages of the present invention which are not described will be able to be understood and will be more apparently appreciated by the embodiment of the present invention. Further, it will be able to be appreciated that the object and advantages of the present invention can be implemented by the means and the combination thereof described in the appended claims.

According to an aspect of the present invention, there is provided a cart robot which controls movement thereof in a movement restricted area, the cart robot including a positioning sensor configured to receive a signal from a transmission module, a movement unit configured to move the cart robot, and a controller configured to control the movement unit to park the cart robot around the movement restricted area when the positioning sensor receives data notifying that the cart robot enters the movement restricted area from the transmission module.

The controller may set a neutral area using an entry width of the movement restricted area and a distance to the movement restricted area, and when the transmission module is in the neutral area, the positioning sensor may measure a distance to the transmission module and the controller temporarily may stop the cart robot.

The cart robot may further include a camera sensor configured to photograph a periphery of the cart robot and an artificial intelligence module configured to compare or analyze an image to generate description information, wherein the camera sensor may capture an image of the periphery of the cart robot, and the controller may input the captured image to the artificial intelligence module and then determine a movement restricted area or a parking area around the cart robot using the description information output by the artificial intelligence module.

The cart robot may further include an accommodation part sensor configured to sense movement of an object in an accommodation part, wherein, while the cart robot is parked or after the cart robot is parked, the controller may control the accommodation part sensor to operate a security mode in which an inside of the accommodation part is monitored.

According to an aspect of the present invention, there is provided a method of controlling a cart robot in a movement restricted area, the method including receiving, by a positioning sensor of a cart robot, data notifying that the cart robot enters a movement restricted area from a transmission module, searching for, by a controller of the cart robot, a parking area around the movement restricted area, and moving, by the controller, the cart robot to the found parking area to park the cart robot.

BRIEF DESCRIPTION OF THE DRAWINGS

FIG. 5 illustrates an operation process of the cart robot when a user enters a movement restricted area according to an embodiment of the present invention.

FIG. 7 illustrates a process in which a cart robot is parked according to an embodiment of the present invention.

FIG. 8 illustrates a state in which cart robots are aligned in a new parking process according to an embodiment of the present invention.

FIG. 17 illustrates a process in which an AI module generates description data on an image after the image is acquired according to an embodiment of the present invention.

DETAILED DESCRIPTION OF EXEMPLARY EMBODIMENTS

Figure 1:
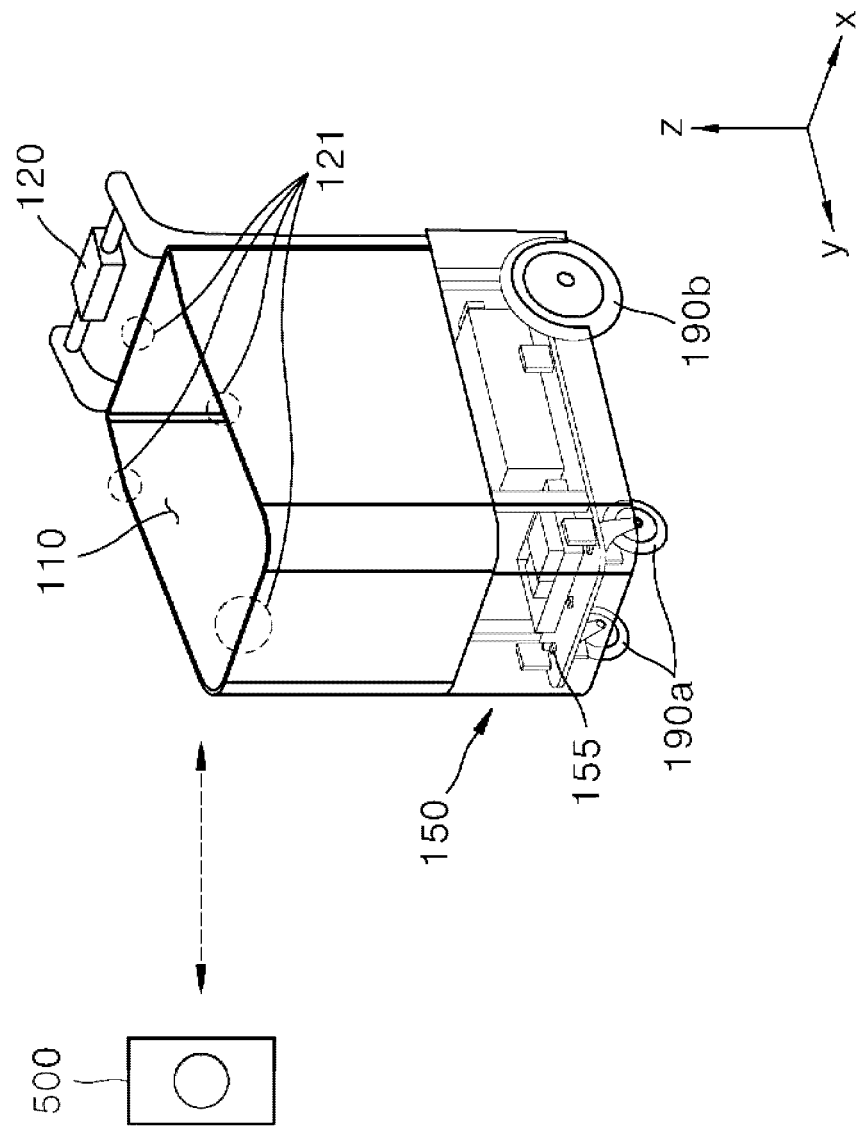
FIG. 1 illustrates an exterior of a cart according to an embodiment of the present invention.

Hereinafter, embodiments of the present invention will be described in detail with reference to the accompanying drawings so that those of ordinary skill in the art can easily implement the embodiments. The present invention may be embodied in many different forms and is not limited to the embodiments set forth herein.

Parts irrelevant to description are omitted in the drawings in order to clearly explain the present invention. The same reference numerals are allocated to the same or similar components throughout this specification. In addition, some embodiments of the present invention will be described in detail with reference to example drawings. In the following description, like reference numerals designate like elements although they are shown in different drawings. In the following description of the present invention, detailed descriptions of known components and functions incorporated herein will be omitted in the case that the subject matter of the present invention may be rendered unclear thereby.

In describing the components of the present invention, there may be terms used such as first, second, A, B, (a), and (b). Such terms are merely used to distinguish one component from another component. The substance, sequence, order, or number of these components is not limited by these terms. When a component is referred to as being "coupled" or "connected" to another component, it should be understood that the component is coupled or connected directly to another component or still another component is "interposed" therebetween or the components may be "coupled" or "connected" to each other with still another component interposed therebetween.

Further, in implementing the present invention, for convenience of description, components will be described by being subdivided. However, these components may be implemented in a device or a module, or a component may be implemented by being divided into a plurality of devices or modules.

Hereinafter, devices which move to autonomously follow a user or move based on electrical energy under control of a user will be referred to as a smart cart robot, a cart robot, or a cart for short. The cart robot may be used in a department of a supermarket or a department store. Alternatively, the cart robot may be used in a space such as an airport or a harbor in which many travelers move. The cart robot may also be used in a leisure space such as a golf course.

In addition, the cart robot includes all devices which track a position of a user to follow the user and have a certain storage space. The cart robot includes all devices that move using electric power under control of the user pushing or pulling the cart robot. As a result, the user may move the cart robot without operating the cart robot. In addition, the user may move the cart robot with a very small force.

Furthermore, in the present specification, the cart robot may move using electric power based on control of a user. To this end, the cart robot may finely analyze a force controlled by the user and may perform a function for a movement speed, a movement direction, or movement/stop of the cart.

In the present specification, the cart robot determines an area to which the cart robot is allowed to move and an area to which the cart robot is not allowed to move, i.e., a movement restricted area. In the movement restricted area, the cart robot performs an operation suitable for the movement restricted area. For example, the cart robot may enter a security mode so that others may not operate the cart robot. Alternatively, the cart robot may enter a parking mode and may remain in a stationary state without moving.

Figure 2:
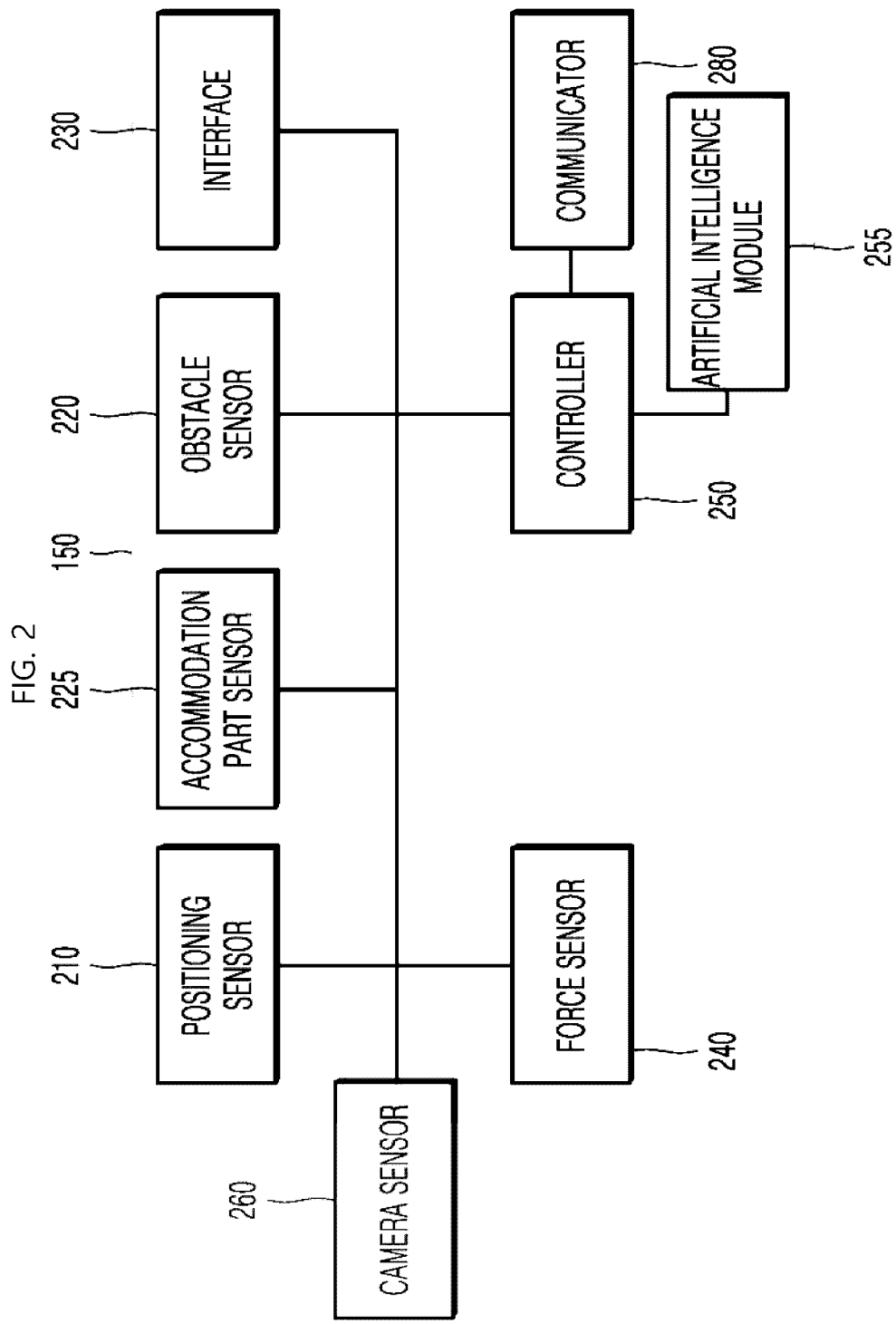
FIG. 2 illustrates a detailed configuration of a control module of the cart according to the embodiment of the present invention.

FIG. 1 illustrates an exterior of a cart according to an embodiment of the present invention. FIG. 2 illustrates a detailed configuration of a control module 150 of the cart according to the embodiment of the present invention.

A cart robot 100 includes an accommodation part 110, a handle assembly 120, a control module 150, and movement units 190a and 190b. The accommodation part 110 is a space in which a user accommodates or loads objects. The handle assembly 120 allows the user to manually or semi-automatically control movement of the cart robot 100.

The handle assembly 120 is disposed on one surface of the cart robot. When the user applies a force in a process of controlling the cart robot 100, the handle assembly 120 senses the force applied by the user. The control module 150 controls movement of the cart robot 100. The control module 150 moves the movement unit 190 by determining a movement direction or a movement speed of the cart according to the force sensed by the handle assembly 120. Accordingly, the user may push or pull the cart robot 100 forward and backward or may change a direction of the cart robot 100 using the handle assembly 120. The control module 150 controls the movement of the cart robot 100.

The control module 150 controls autonomous traveling of the cart robot 100 using a transmission module 500 such that the cart robot 100 follows the user in an autonomous traveling mode. In addition, the control module 150 controls semi-autonomous traveling (power assist) in which the cart robot travels by assisting a force of the user when the user pushes or pulls the cart robot with a small force in a power assist mode.

Accordingly, when the user applies a force to the handle assembly 120 to control the cart, a force sensor 240 senses the force applied to the handle assembly 120. The force sensor 240 may sense a change in force per unit time or a magnitude of a force applied to the handle assembly 120. The force sensor 240 is disposed in the handle assembly 120. A controller 250 of the control module 150 confirms a magnitude, a direction, an increase rate, and the like of a force sensed by the force sensor 240. That is, the force sensor 240 is physically disposed in the handle assembly 120 and logically interworks with the controller 250 of the control module 150.

An interface 230 may be disposed in the handle assembly 120 to output certain information to a user. The interface 230 may also become a component controlled by the control module 150. The interface 230 may display a method of controlling the cart robot 100 and the handle assembly 120 to the user. Alternatively, the interface 230 may output a warning message to the user in a process of controlling the cart robot 100 and the handle assembly 120.

An obstacle sensor 220 may be disposed in a specific region of the cart robot 100 to sense obstacles disposed around the cart. The obstacle sensor 220 may be disposed in various regions such as a lower end, an upper end, and the like of the cart robot 100. For example, a plurality of obstacle sensors 220 may be disposed in a region indicated by reference numeral 155 to sense obstacles in front, left, right, and rear of the cart.

In an embodiment, the obstacle sensors may be disposed on a front surface and side surfaces of the cart robot so as to correspond to a direction in which the cart robot 100 moves. Alternatively, when the cart robot 100 moves backward, the obstacle sensors may be disposed on front and rear surfaces and both side surfaces of the cart robot 100.

In addition, positioning sensors 210 may be disposed in various regions of the cart robot 100 and may track a position of a user so as to follow the user. The positioning sensor 210 may receive a signal from the transmission module 500 configured to output a specific signal and may confirm the position of the user.

That is, the cart robot 100 may be remotely disposed and may move to follow the user by confirming a position of the certain transmission module 500 carried by the user. The cart robot 100 may optionally implement a function of confirming the position of the user to follow the user.

The movement unit 190 moves the cart under control of the controller. In addition, the movement unit 190 may move the cart along a certain path generated by the controller 250. The movement of the movement unit 190 allows the controller 250 to check a movement state of the cart robot 100 based on a speed of revolution, a number of revolutions, a direction, and the like of a wheel. The movement unit 190 includes a certain brake device. The controller 250 may control the brake device of the movement unit 190 to stop the cart robot 100 which is moving.

In addition, the controller 250 may check whether the cart robot 100 is positioned on a ramp or on flat ground by checking a horizontal level of wheels constituting the movement unit 190. Of course, according to another embodiment, the controller 250 may check whether a current position of the cart is flat ground or a ramp by using a horizontal sensor.

The force sensor 240 is disposed in the handle assembly 120. When a user applies a force to the handle assembly 120, the force sensor 240 senses a magnitude of the force or a change in the force, or the like.

The force sensor 240 includes various sensors such as a Hall sensor, a magnetic type sensor, and a button type sensor.

The control module 150 may control the movement units 190a and 190b. The movement unit 190 moves the cart robot along a movement path generated by the controller 250. The movement unit 190 may move the cart robot 100 by rotating the wheels constituting the movement unit 190. The movement of the cart robot by the movement unit 190 allows the controller 250 to confirm a position of the cart robot 100 based on a speed of revolution, a number of revolutions, a direction, and the like of the wheel. The movement path generated by the controller 250 includes angular speeds applied to a left wheel and a right wheel of the cart robot.

As shown in FIG. 2, a detailed configuration of the control module 150 includes logical components such as the positioning sensor 210, the force sensor 240, the obstacle sensor 220, an accommodation part sensor 225, the interface 230, the controller 250, a camera sensor 260, and a communicator 280.

The obstacle sensor 220 senses obstacles disposed around the cart robot. The obstacle sensor 220 may sense a distance between the cart robot and a person, a wall, an object, a fixed object, or an installed object.

The accommodation part sensor 225 as one kind of the obstacle sensor 220 may be disposed at each of positions indicated by reference numeral 121 of FIG. 1. The positions indicated by reference numeral 121 of FIG. 1 are boundary regions of the accommodation part 110. The accommodation part sensor 225 senses a case in which an article or a person's hand is put into the accommodation part 110. In an embodiment, the accommodation part sensor 225 may include an ultrasonic sensor, an infrared sensor, or the like.

The obstacle sensor 220 senses obstacles disposed around the cart robot. The obstacle sensor includes a sensor which measures a distance or acquires an image and identifies an obstacle in the image. In an embodiment, the obstacle sensor 220 configured to measure a distance is an infrared sensor, an ultrasonic sensor, a LiDAR sensor, or the like.

In addition, the obstacle sensor 220 includes a depth sensor or a red-green-blue (RGB) sensor. The RGB sensor may sense an obstacle and an installed object in an image. The depth sensor calculates depth information for each point in an image. The obstacle sensor 220 includes a time-of-flight (ToF) sensor.

The positioning sensor 210 is an essential component of a cart robot which supports autonomous traveling. The positioning sensor 210 may track a position of a user which carries the transmission module 500 and may be disposed at an upper end or side surfaces of the cart robot 100. However, the positions of the sensors may be variously changed according to embodiments, and the present invention is not limited thereto. Regardless of the positions of the sensors, the control module 150 controls the sensors or utilizes information sensed by the sensors. That is, the sensors are logical components of the control module 150 regardless of physical positions thereof.

The positioning sensor 210 receives a signal from the transmission module 500 and measures a position of the transmission module 500. When the positioning sensor 210 uses an ultra-wideband (UWB), a user may carry the transmission module 500 which transmits a certain signal to the positioning sensor 210. The positioning sensor 210 may confirm the position of the transmission module 500 as a position of the user. In an embodiment, the user may carry the transmission module 500 in the form of a band attached to his or her wrist.

In addition, the interface may be disposed in the handle assembly 120 to output certain information to the user. The interface may also become a component controlled by the control module 150. The handle assembly 120 includes the force sensor 240 which senses a force with which the user pushes or pulls the cart robot.

The force sensor 240 may be disposed outside or inside the cart robot 100 to which a change in force is applied by an operation of the handle assembly 120. The position and configuration of the force sensor 240 may be variously applied, and embodiments of the present invention are not limited to the specific force sensor 240.

The force sensor 240 is disposed in the handle assembly 120 or disposed outside or inside the cart robot 100 connected to the handle assembly 120. When the user applies a force to the handle assembly 120, the force sensor 240 senses a magnitude of the force or a change in the force, or the like. The force sensor 240 includes various sensors such as a Hall sensor, a magnetic type sensor, and a button type sensor. The force sensors 240 may be disposed in the handle assembly or inside or outside the cart robot 100 as a left force sensor and a right force sensor.

The controller 250 accumulates and stores position information of the transmission module 500 and generates a movement path corresponding to the stored position information of the transmission module. In order to accumulate and store the position information, the controller 250 may store position information of each of the transmission module 500 and the cart robot 100 as absolute position information (absolute coordinates) based on a certain reference point.

Alternatively, the controller 250 may control movement of the cart robot using the obstacle sensor 220 and the camera sensor 260. The camera sensor 260 photographs a periphery of the cart robot.

In addition, the controller 250 controls a movement direction or a movement speed of the movement unit according to a change in force or a magnitude of the force sensed by the force sensor 240. Alternatively, in order to control the movement speed, the controller 250 may control the movement unit 190 to supply more electric energy to a motor of the movement unit.

Furthermore, the controller 250 detects an installed object disposed around the cart robot using a value sensed by the obstacle sensor 220. The controller 250 may check the installed object using the obstacle sensors 220 disposed on the side surfaces and the front surface of the cart robot.

In particular, when the positioning sensor 210 receives data for notifying that the cart robot 100 enters a movement restricted area from the transmission module 500, the controller 250 controls the movement unit 190 to park the cart robot 100 around the movement restricted area.

In the preset specification, when it is conformed that a user enters a specific area in a process in which the cart robot 100 moves to follow the user, the cart robot 100 may stop following the user and may be parked. When the user enters an entry prohibited area (movement restricted area) of the cart robot 100, the cart robot 100 may stop moving to the entry prohibited area and may wait until the user exits the movement restricted area.

Figure 3:
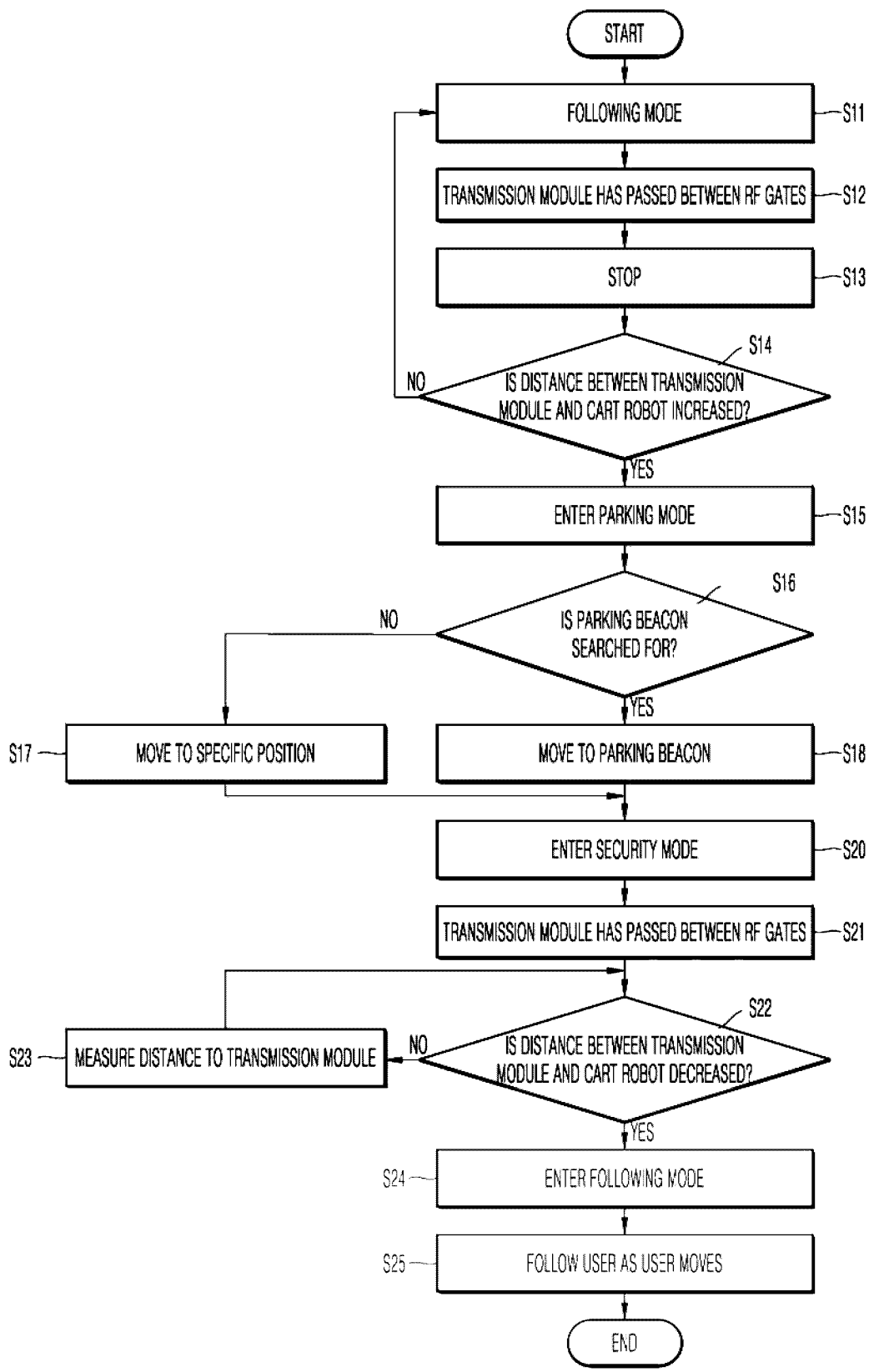
FIG. 3 illustrates an operation process of the cart robot according to the embodiment of the present invention.

FIG. 3 illustrates an operation process of the cart robot according to the embodiment of the present invention. While the cart robot moves in a following mode (S11), the cart robot confirms that the transmission module 500 has passed between radio frequency (RF) gates (S12). Such a process includes a detailed process in which, when a user carrying the transmission module 500 moves to a movement restricted area, the transmission module 500 receives a certain wireless signal from the RF gate disposed at an entrance side of the movement restricted area and transmits the received certain signal to the cart robot 100.

Since the transmission module 500 has entered the movement restricted area, the cart robot 100 stops moving and comes to a stop (S13). In this case, the cart robot 100 continuously checks a distance to the transmission module 500. When the distance is not increased (S14), since the user is likely to have exited through the RF gate again, the cart robot 100 enters a following mode (S11).

When the distance between the transmission module 500 and the cart robot 100 is increased in operation S14, since the user has entered the movement restricted area, the cart robot 100 enters a parking mode (S15). The controller 250 of the cart robot searches for a parking area around the movement restricted area so as to park.

In an embodiment, the cart robot 100 searches for a nearby parking beacon so as to park (S16). When the parking beacon is not searched for as a search result, the cart robot 100 moves to a specific position (for example, a right wall, a rear wall, or the like) (S17).

When the parking beacon is searched for as the search result, the cart robot 100 moves to the parking beacon (S18).

The cart robot 100 moving to a parking area as in S17 or S18 enters a security mode (S20). The term "security mode" means a mode in which the cart robot maintains parking so as to not be controlled by other users. In addition, the cart robot may monitor articles in the accommodation part 110 so that the articles are not taken out of the accommodation part 110 in the security mode. Furthermore, the cart robot may control the camera sensor 260 in the security mode to capture an image when a person approaches a vicinity thereof.

When the transmission module passes between the RF gates in the security mode (S21), the cart robot 100 checks whether the distance between the transmission module and the cart robot is decreased (S22). When the distance is not decreased as a check result, the cart robot 100 continuously measures a distance to the transmission module 500 and monitors whether the distance between the cart robot 100 and the transmission module 500 is decreased (S23).

When the distance is decreased, the cart robot 100 enters the following mode to move toward the transmission module 500 (S24). The cart robot 100 also moves as the user, i.e., the transmission module, moves (S25).

Figure 4:
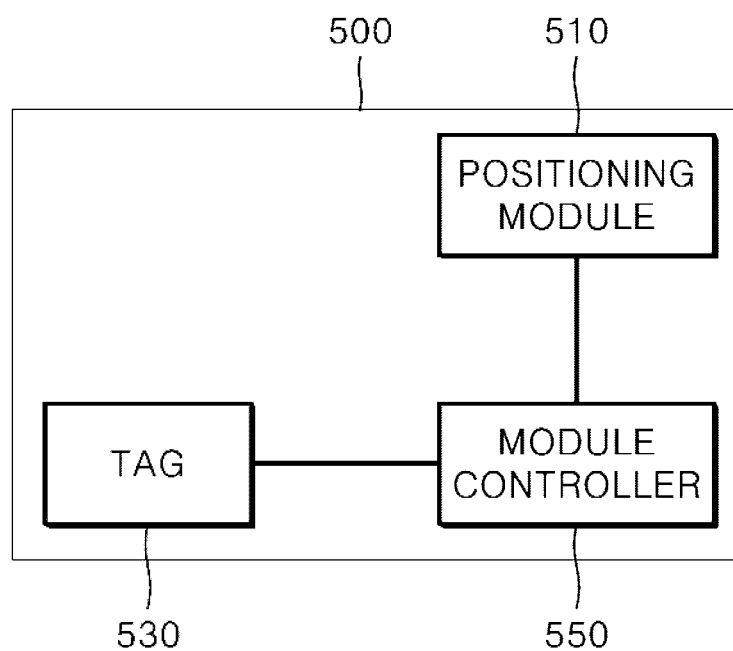
FIG. 4 illustrates a configuration of a transmission module according to the embodiment of the present invention.

FIG. 4 illustrates a configuration of the transmission module according to the embodiment of the present invention. In an embodiment, the transmission module 500 is a tag which is worn or carried by a user.

Main components of the transmission module 500 include a positioning module 510 configured to transmit a signal based on a first protocol (for example, UWB) to a first robot (following robot) and a tag 530 configured to sense a signal transmitted by a device installed in a movement restricted area. The transmission module 500 is a kind of beacon and transmits information for notifying the cart robot 100 of a position thereof.

In addition, when the tag 530 receives a specific signal, a module controller 550 of the transmission module 500 controls the positioning module 510 to transmit a signal reception state to the cart robot 100.

The tag 530 of the transmission module 500 of FIG. 4 may receive a signal transmitted by a certain signal transmitter (for example, an RF reader, an RF signal transmitter, or the like) installed in a movement restricted area. When the module controller 550 transmits the received signal to the cart robot 100 through the positioning module 510, the cart robot 100 may confirm that the transmission module 500 enters or exits the movement restriction area.

FIG. 5 illustrates an operation process of the cart robot when a user enters a movement restricted area according to an embodiment of the present invention.

As shown in FIG. 5(31), a user carries the transmission module 500 followed by the cart robot 100. FIG. 5(31) illustrates a scene in which the user passes between gates 1a and 1b disposed at an entrance side of a movement restricted area. The movement restricted area is an entry prohibited area into which the cart robot is not allowed to enter.

The transmission module 500 will be mainly described with reference to FIG. 5(32). When the transmission module 500 passes between the gates 1a and 1b that are structures installed in the movement restricted area, the transmission module 500 receives signals transmitted from signal transmitters 5a and 5b in the gates 1a and 1b.

Here, in an embodiment, an RF transmitter is an example of the signal transmitters 5a and 5b. In this case, the RF transmitter senses an RF tag disposed in an article disposed in the movement restricted area. The RF tag may be used as an anti-theft tag for an article or may be used to track a transfer of an article. Thus, the RF tag may be disposed in the transmission module 500 as the tag 530.

For example, when the signal transmitters 5a and 5b transmit RF signals, the tag 530 of the transmission module 500 may sense the RF signals. The transmission module 500 may sense that the user passes between the gates 1a and 1b disposed in the movement restricted area and may transmit information on the passing to the cart robot 100.

That is, when the transmission module 500 notifies the cart robot 100 that the RF signals are sensed, as shown in FIG. 3, the cart robot 100 exits a following mode and enters a parking mode. In addition, the cart robot 100 may enter a security mode such that other users may not control the cart robot 100.

That is, to sum up the descriptions with reference to FIG. 5, the user carrying the transmission module 500 enters the movement restricted area which is an area into which the cart robot is not allowed to enter. In such a process, the user passes between the RF gates 1a and 1b. In an embodiment, the gates are RF gates for checking movement of a user or preventing a theft of an article in the movement restricted area.

The transmission module 500 senses the gates in a process of passing between the RF gates 1a and 1b and transmits the sensing result to the cart robot 100. The cart robot 100 may enter the parking mode and wait according to a distance to the transmission module 500, intensity of a signal, or the like.

In FIG. 5, the cart robot 100 may pre-store information on a width d between the RF gates 1a and 1b, that is, an interval between the gates, or a size of a region through which the user or other thing may pass. Alternatively, the cart robot 100 may calculate the width between the gates in a vicinity of the gates.

Figure 6:
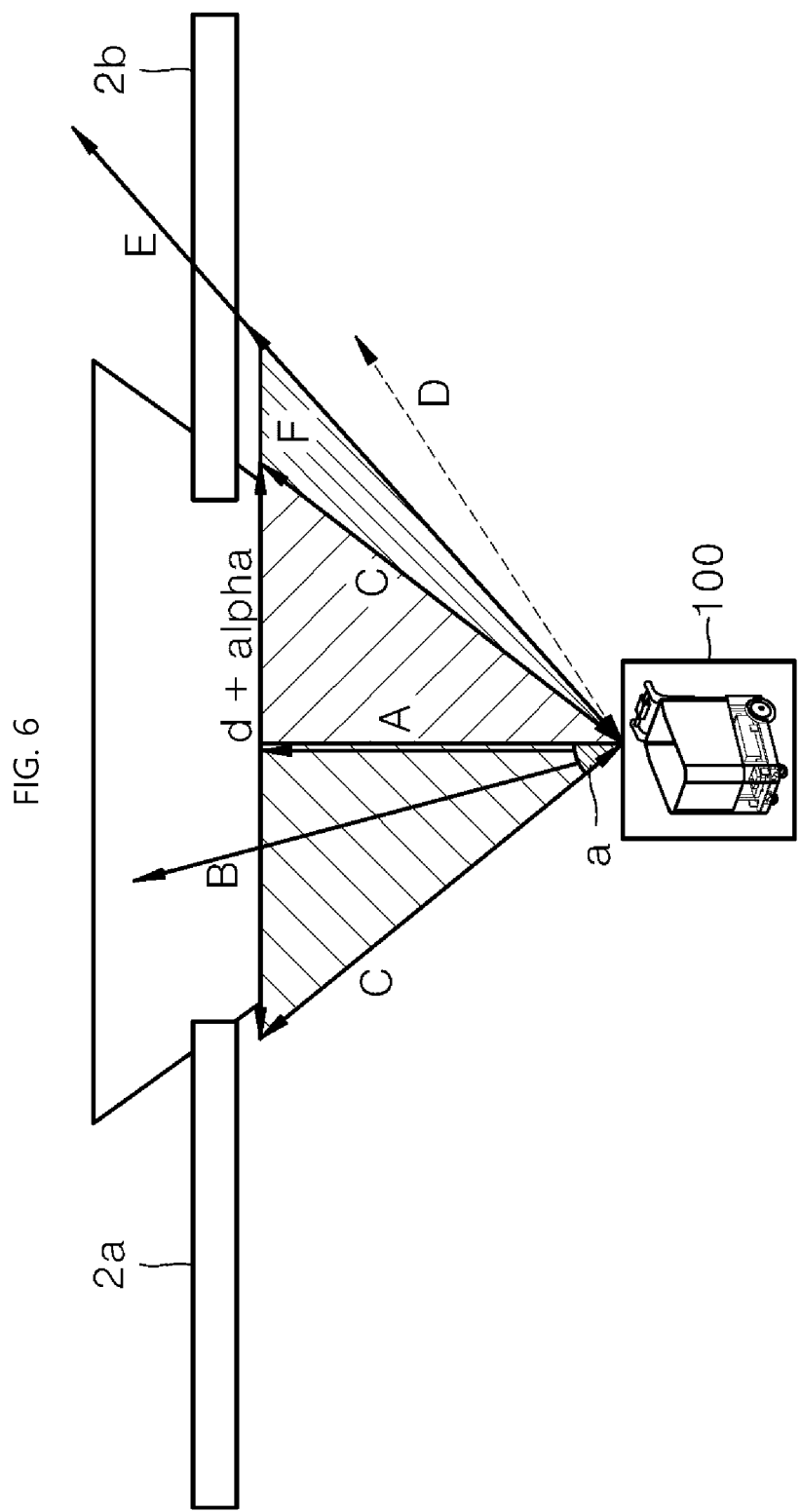
FIG. 6 illustrates a process in which the cart robot determines whether the transmission module has entered a movement restricted area according to an embodiment of the present invention.

FIG. 6 illustrates a process in which the cart robot determines whether the transmission module has entered a movement restricted area according to an embodiment of the present invention.

The cart robot 100 may check a width between gates. For example, the cart robot 100 may store information on a width of a space between two walls 2a and 2b, through which the user or other thing may pass, or may read information on the width of the space from a memory. When widths between gates installed in respective spaces are constant, the cart robot 100 pre-stores information on the width. When the user passes between the gates, the cart robot 100 may extract a value of the width.

Alternatively, even when the widths between the gates installed in the respective spaces are different, the cart robot 100 may store information on the width between the gates for each position. In this case, the cart robot 100 may extract information on a passage region in a process of loading information on an adjacent restricted movement area using a current position.

Alternatively, the cart robot 100 may photograph gates and image-match the photographed gates to calculate a width between the gates (distance between two gates).

In the above-described process, the cart robot 100 may calculate information on an interval between the gates, that is, the width, or may read a stored value of the width. The cart robot 100 may set a neutral area based on the information or the stored value.

When a user passes between the gates, that is, when a gate passage signal is generated from the transmission module 500, the cart robot 100 determines whether a position of the transmission module 500 (position of the user) belongs to the neutral area. When the position of the transmission module 500 belongs to the neutral area, the cart robot 100 waits so as to determine whether the user has actually passed between the gates and has entered the movement restricted area.

The neutral area may be set in a variety of ways. In an embodiment, as shown in FIG. 6, the controller 250 may set the neutral area using an entry width of the movement restricted area and a distance to the movement restricted area. For example, the entry width of the restricted movement area may be an interval between the gates, and the distance to the movement restricted area may be a distance between the restricted movement area and the cart robot. The controller 250 may set the neutral area by creating a triangle using the width and the distance.

More specifically, the cart robot 100 sets a triangle with a base d+alpha and a height as the neutral area, wherein the base d+alpha corresponds to the sum of a pre-stored interval d between the gates and an extra distance alpha and the height corresponds to a distance A sensed when the cart robot passes between the gates.

When the transmission module is in the neutral area, the positioning sensor 210 measures a distance to the transmission module 500, and the controller 250 temporarily stops the cart robot. Descriptions will be provided in more detail.

The cart robot 100 determines whether the transmission module 500 has entered the movement restricted area as follows.

First, in the following, case, the cart robot 100 determines that the transmission module 500 has passed between gates and has entered the movement restricted area.

For example, when a position of the transmission module 500 is outside of a maximum distance C within an azimuth angle (an arrow represented by B), the cart robot 100 determines that the transmission module 500 has entered a department.

In addition, when a position of a user is out of the azimuth angle a, the cart robot 100 draws a virtual triangle based on a current angle and the distance A to the gate. That is, the controller 250 sets a triangle as a neutral area, wherein the triangle has one point corresponding to a current position of the cart robot and two points corresponding to both ends of an entry width of a movement restricted area.

In an embodiment, the both ends of the entry width of the movement restricted area are both ends of the two gates 1a and 1b of FIG. 5. In addition, in an embodiment, the both ends of the entry width of the movement restricted area are a disconnected portion between the two walls 2a and 2b of FIG. 6.

When the distance between the cart robot 100 and the transmission module 500 is greater than or equal to a maximum value F of the virtual triangle, it is considered that the transmission module 500 has entered the department.

When a signal of the positioning module 510 of the transmission module 500, such as a UWB signal, is interrupted by an obstacle such as a wall, the cart robot 100 determines that the transmission module 500 has entered the department.

On the other hand, in the following case, the cart robot 100 waits until a behavior of a user is determined. That is, when the transmission module 500 is highly likely to not enter the movement restricted area, the cart robot 100 first maintains a waiting state.

In an embodiment, when a position of the user, that is, a position of the transmission module 500, is in the neutral area, the cart robot 100 waits until movement of the transmission module 500 becomes clear.

In addition, in the following case, the cart robot 100 considers that the transmission module 500 has not passed between the gates and has exited the gates. That is, when the position of the transmission module 500 is within the maximum distance F (in the case of D) in a state in which the transmission module 500 deviates from the azimuth angle a, the cart robot 100 determines that the transmission module 500 has not entered the movement restricted area.

On the contrary, when the position of the transmission module 500 is outside of the maximum distance F (in the case of E) in a state in which the transmission module 500 deviates from the azimuth angle a, the cart robot 100 determines that the transmission module 500 has entered the movement restricted area.

As shown in FIG. 6, the cart robot 100 checks an interval between nearby fixed objects 2a and 2b or gates (see 1a and 1b of FIG. 5), sets a neutral area based on distances to the fixed objects 2a and 2b or gates, and determines whether the transmission module 500 has entered a movement restricted area. When the transmission module 500 has entered the movement restricted area, the cart robot 100 performs a parking mode.

FIG. 7 illustrates a process in which a cart robot is parked according to an embodiment of the present invention.

As described with reference to FIG. 3, the cart robot 100, which confirms that the transmission module 500 has entered the movement restricted area (S14), enters the parking mode (S15) and moves to a parking area designated as an area into which the cart robot 100 is allowed to enter. For example, as shown in FIG. 7(35), when a parking beacon 3 is searched for, the cart robot moves to the parking beacon 3 (S18).

Alternatively, when the parking beacon 3 is not searched for, as shown in FIG. 7(36), the cart robot moves to a designated parking area (for example, a wall). When the cart robot 100 enters the parking mode, the cart robot 100 continues to move to a specific wall (for example, a right end wall). The cart robot 100 is parked at a corresponding wall.

When the cart robot 100 moves to the parking beacon 3 and is parked or when the cart robot 100 is parked at the wall, the cart robot 100 senses a distance to another cart robot and a distance to the wall and secures a distance to another object, i.e., a certain parking space, so as to smoothly move to follow the transmission module 500 when the cart robot 100 exits a parking mode and enters a following mode later.

When it is confirmed that the transmission module passes between gates as shown in FIG. 7, the cart robot 100 enters a parking mode. The cart robot 100 enters an automatic parking mode and moves to a designated parking area without moving to follow the transmission module 500. The designated parking area may be an area in which the parking beacon 3 is disposed or an adjacent wall. Alternatively, when an image indicating a parking area is attached to a wall, the cart robot 100 may determine a periphery of the image as a parking area.

FIG. 8 illustrates a state in which cart robots are aligned in a new parking process according to an embodiment of the present invention. The cart robots are parked around a wall 9. The parking beacon 3 is also provided.

Cart robots C1, C2, and C3 are parked at an interval of s1 at a wall side. In such a process, when a new cart robot 100 enters a parking mode and moves to a designated parking area, the new cart robot 100 is aligned in the following manner.

First, when the cart robot 100 enters the parking mode, the cart robot 100 moves in a state of being spaced from the wall by a certain distance of s1 or more.

For example, as shown in FIG. 8(37), the cart robot 100 photographs in front thereof using the camera sensor 260 and checks whether the other cart robots are parked. When the cart robots are already parked, the cart robot 100 is disposed to the rear or front of the cart robots. FIG. 8(37) illustrates that the cart robot 100 is parked to the rear of the cart robots. In FIG. 8(37), the cart robot 100 maintains an interval of s1 from the wall.

On the other hand, when a distance to the parking beacon 3 during an attempt to park the cart robot 100 is greater than or equal to a certain distance or when a distance, by which the cart robot 100 moves along the wall, is short, the cart robot 100 moves to a next column as shown in FIG. 8(38). When the cart robot 100 moves to the next column, the cart robot 100 maintains a distance to a cart robot next thereto by a certain distance of s2 such that the cart robot 100 fully moves out of a parking area.

The certain distance of s2 is a value greater than a width of the cart robot. That is, even when a plurality of cart robots are disposed in a second column, cart robots disposed at positions corresponding to C1 and C2 may fully move out of the positions C1 and C2.

The controller 250 allows distances to objects in front, rear, left, and right of the cart robot 100 to be maintained at a preset distance or more in a process of parking the cart robot 100. The controller 250 allows the cart robot 100 or other cart robots to exit the parking mode to easily exit a parking area later. In order to maintain a distance, the controller 250 may control the movement unit 190 to maintain a distance to other cart robots or the wall at the above-described distance or more.

Figure 9:
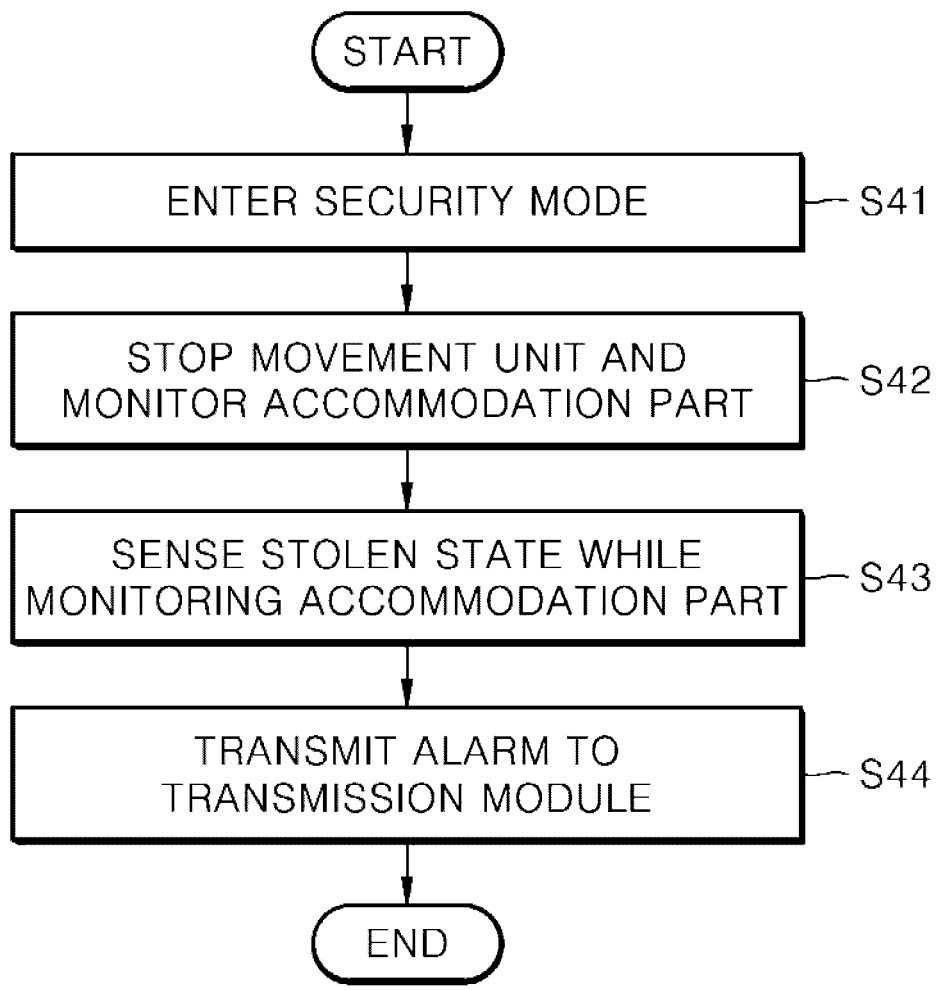
FIG. 9 illustrates an operation of the cart robot in a security mode according to an embodiment of the present invention.

FIG. 9 illustrates an operation of the cart robot in a security mode according to an embodiment of the present invention. The cart robot moving to a parking area may operate a security mode for theft prevention.

The cart robot 100 moving to a parking area enters the security mode (S41). In the security mode, the controller 250 of the cart robot 100 stops the movement unit 190 and monitors the accommodation part 110 (S42). Alternatively, the cart robot 100 may monitor the accommodation part 110 even while moving to the parking area.

The accommodation part sensor 225 disposed at each of the positions indicated by reference numeral 121 of FIG. 1 senses movement of an object or movement of a nearby object. That is, the accommodation part sensor 225 senses a case in which an article is put into the accommodation part 110, an accommodated article is carried out of the accommodation part 110, or a person's hand is put into the accommodation part 110. The accommodation part sensor 225 may include an ultrasonic sensor, an infrared sensor, or the like. The accommodation part sensor 225 senses a stolen state while monitoring the accommodation part (S43).

When the stolen state occurs, the cart robot 100 transmits an alarm to the transmission module (S44). In addition, the cart robot 100 also senses a situation, in which an attempt is performed to move the cart robot 100 with a strong force from the outside in a state in which the movement unit 190 is stopped, as a stolen state and transmits an alarm to the transmission module (S44).

As shown in FIG. 9, the cart moving to the parking area may securely store an article in the accommodation part 110 by operating the security mode for theft prevention. To this end, while the cart robot 100 is parked or after the cart robot 100 is parked, the controller 250 may control the accommodation part sensor 225 to perform the security mode of monitoring an inner side of the accommodation part 110.

Figure 10:
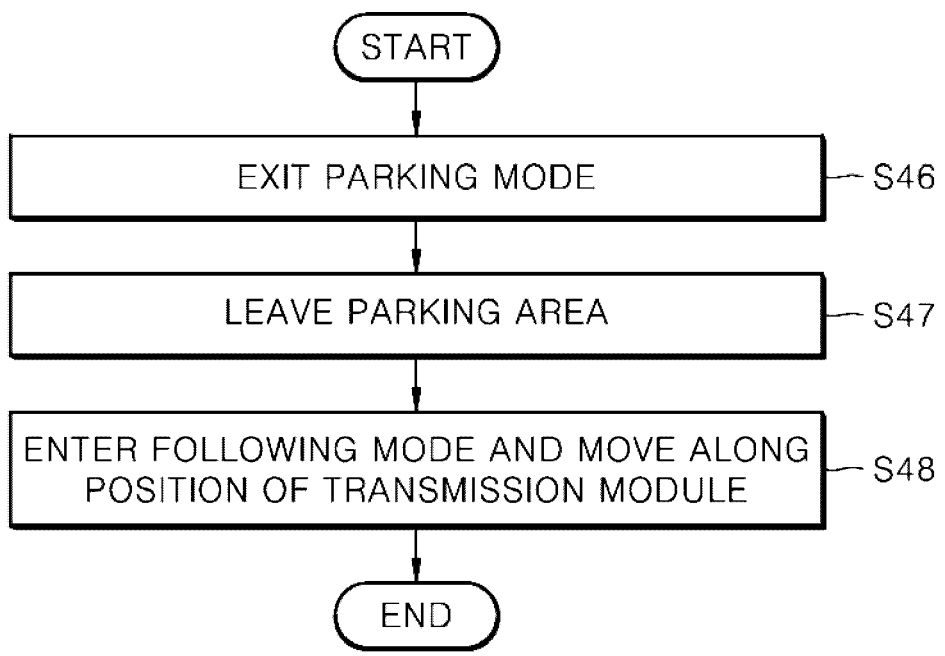
FIG. 10 illustrates a process in which the cart robot enters a following mode according to an embodiment of the present invention.

FIG. 10 illustrates a process in which the cart robot enters a following mode according to an embodiment of the present invention. When a user exits a movement restricted area, that is, the user exits through gates, the transmission module 500 may receive a specific signal at the gates and may transmit the received specific signal to the cart robot 100.

Alternatively, when the user exits the movement restricted area, the cart robot 100 continuously sensing a position of the transmission module 500 may receive a signal transmitted by the positioning module 510 of the transmission module 500 and may confirm a position of the user.

The cart robot 100 exits the parking mode (S46) and leaves the parking area (S47). The cart robot 100 enters a following mode and moves to follow a position of the transmission module (S48).

As shown in FIG. 10, parked cart robots may be newly aligned when any one of the cart robots leaves a parking area. For example, in a parked state, the cart robots may monitor distances to other cart robots or a distance to a wall. When another adjacent cart robot leaves and exits the parking area, the cart robots may confirm that a new space occurs.

That is, after the cart robot is parked the positioning sensor 210 receives data for notifying that the cart robot exits a movement restricted area from the transmission module 500. This means that the transmission module 500 leaves the movement restricted area.

The controller 250 controls the positioning sensor 210 to track a position of the transmission module 500 and moves the cart robot 100 so as to follow the transmission module 500. In this case, the cart robots may move in a preset direction to remove an empty space and be aligned.

Figure 11:
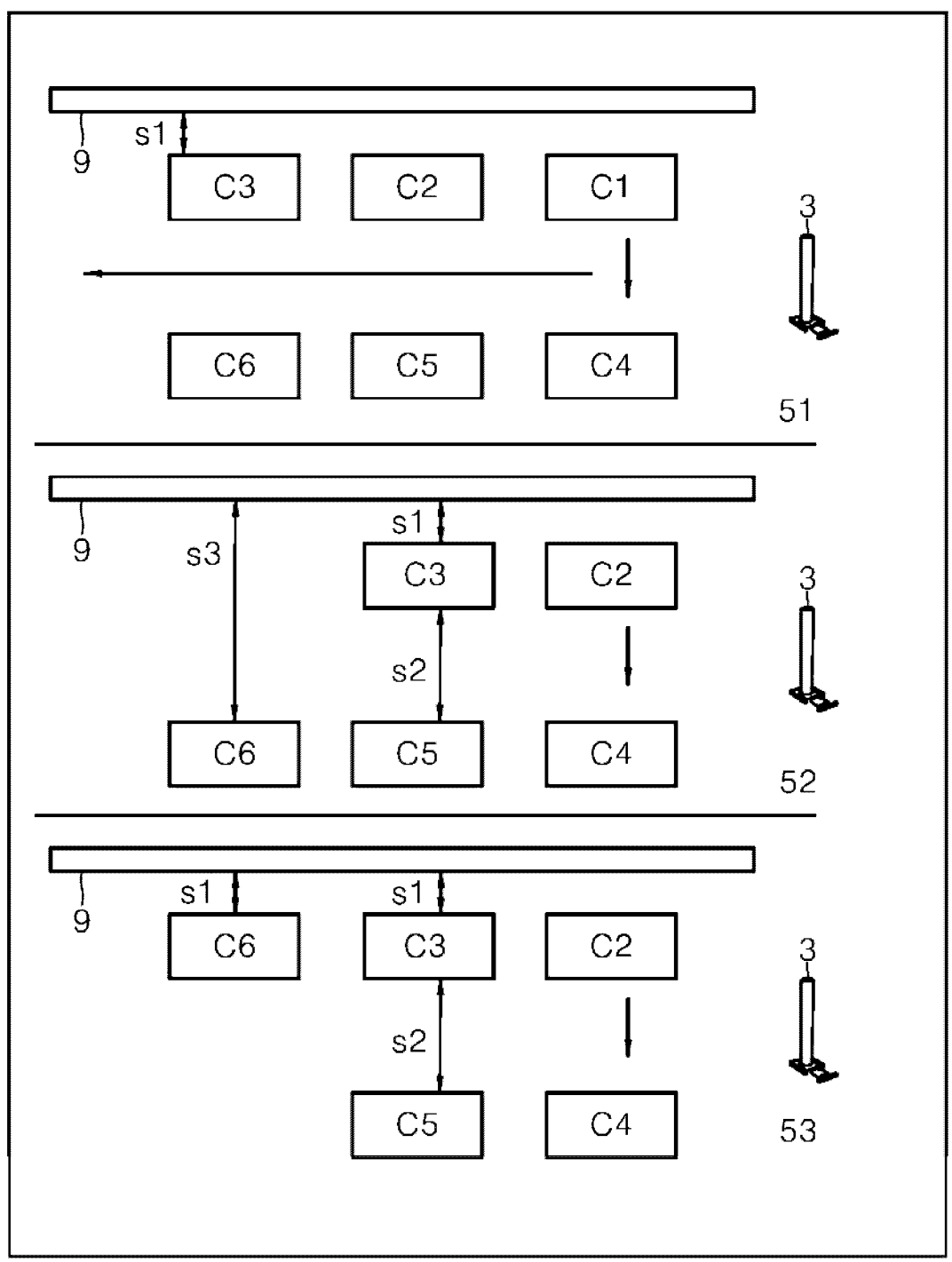
FIG. 11 illustrates a process in which parked cart robots are aligned according to an embodiment of the present invention.

FIG. 11 illustrates a process in which parked cart robots are aligned according to an embodiment of the present invention. C1 to C6 denote cart robots.

In FIG. 11(51), the cart robot C1 leaves a parking area and moves. In this case, a region in which the cart robot C1 is parked becomes an empty space. Therefore, adjacent cart robot C2 senses the empty space of the cart robot C1 and moves to a position of the cart robot C1. In this case, the cart robot C2 may check a distance to the parking beacon 3 and confirm a stop position.

Similarly, sensors of the cart robot C3 also sense an empty space occurring due to movement of the cart robot C2, and the cart robot C3 moves to a position of the cart robot C2 of FIG. 11(51). As a result, as shown in FIG. 11(52), the cart robots in a first column fill empty spaces.

On the other hand, in FIG. 11(52), a distance between the cart robot C6 and a wall is increased by s3 due to movement of the cart robot C3. A distance between the cart robot C6 and the cart robot C3 is s2 in FIG. 11(51). Therefore, the cart robot C6 may also move to an empty space next to a wall.

FIG. 11(53) illustrates a result in which the cart robot C6 moves to the empty space. The cart robot C6 moves until a distance to the wall is s1.

In a process in which the cart robots are realigned to move, two or more cart robots may enter the same empty space. Therefore, when the cart robots find an empty space in a parking area, after the cart robots wait for a certain period of time, the cart robots confirm that the empty space is maintained and then move to sense other cart robots.

In addition, when the cart robots are parked in the parking area, the cart robots may be disposed so as to always face in a specific direction. When an empty space is sensed, the cart robots may move by prioritizing the empty space.

Figure 12:
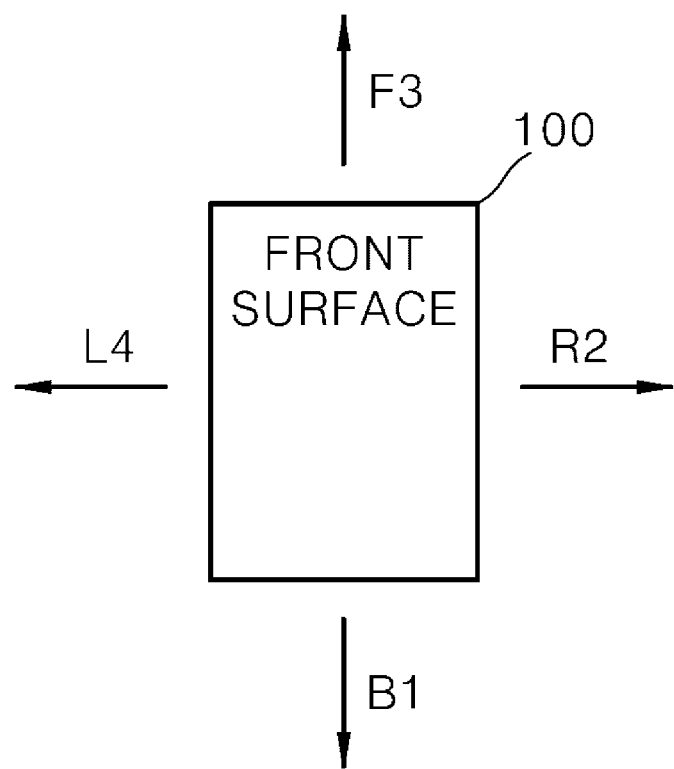
FIG. 12 illustrates an order in which the cart robot senses an empty space according to an embodiment of the present invention.

FIG. 12 illustrates an order in which the cart robot senses an empty space according to an embodiment of the present invention.

The obstacle sensor 220 measures a distance to a nearby cart robot or wall after parking. In this case, the distance may be measured at regular intervals, and in such a process, the controller 250 may confirm that another parked cart robot moves and thus an empty space occurs.

That is, when the obstacle sensor 220 senses an empty space occurring after a nearby cart robot moves, the controller 250 sets waiting times differently according to sensing directions of the obstacle sensor 220. Then, when the empty space is maintained, the controller 250 moves the cart robot to the empty space. This is to prevent a collision from occurring when two or more different cart robots sensing the same empty space enter the same empty space.

In an embodiment, when the cart robot 100 is parked along a wall, a priority may be set exemplarily as follows. That is, a priority of sensing in a rear direction B1 with respect to a front of the cart robot 100 is the highest. A priority of sensing in a right direction R2 is the second highest. A priority of sensing in a front direction F3 is the third highest. A priority of sensing in a left direction L4 is the lowest. The priority of sensing direction is B1>R2>F3>L4.

When an empty space is confirmed in a parking area in the rear direction B1 in which the priority is the highest, the controller 250 immediately moves to the empty space. On the other hand, when an empty space is confirmed in a parking area in the right direction R2 in which the priority is the second highest, the controller 250 moves to the empty space when other cart robots do not enter the empty space.

For example, until a cart robot starts to move after respective sensors confirm an empty space, waiting times are shown in Table 1 below.

TABLE 1

| Sensor direction | Waiting time |
| --- | --- |
| B1 | five seconds |
| R2 | fifteen seconds |
| F3 | thirty seconds (or, when a cart robot is parked rearward to a right wall, the cart robot does not move even when an empty space is sensed) |
| L4 | one minute (or, when a cart robot is parked rearward to a right wall the cart robot does not move even when an empty space is sensed) |

Figure 13:
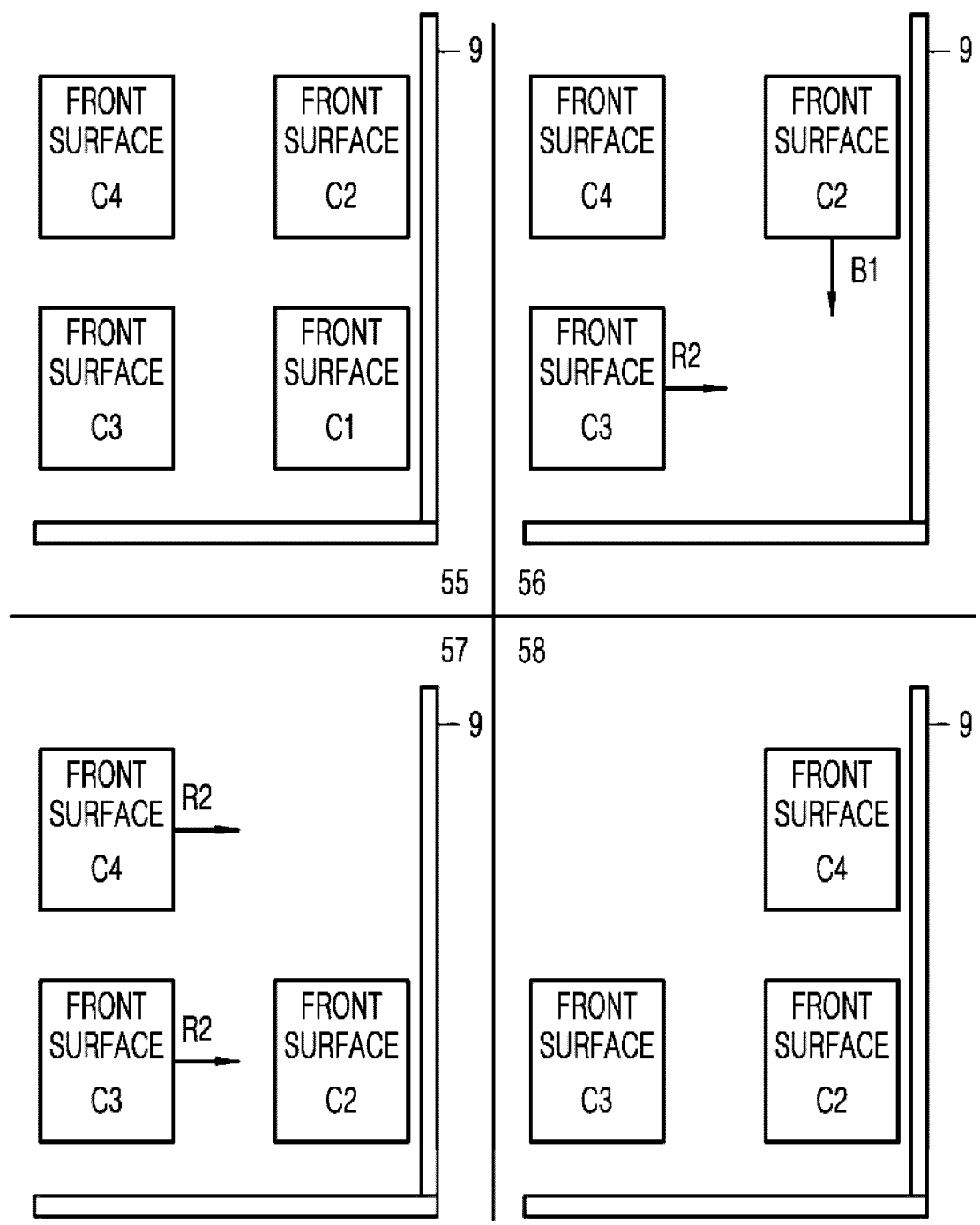
FIG. 13 illustrates a process in which the cart robots are aligned after parking according to an embodiment of the present invention.

FIG. 13 illustrates a process in which the cart robots are aligned after parking according to an embodiment of the present invention. All the cart robots may be parked in the same direction. For example, the controller 250 may control parking of the cart robot in such a manner that the cart robot is parked in a state in which a wall is positioned to a right thereof.

In FIG. 13(55), the cart robot C1 of the cart robots leaves a parking area, and thus, an empty space occurs as shown in FIG. 13(56). Here, a rear sensor of the cart robot C2 in the rear direction B1 or a right sensor of the cart robot C3 sensor in the right direction R2 confirms the empty space.

A sensor of each cart robot has a priority as shown in FIG. 12. That is, when the rear sensor of the cart robot C2 in the rear direction B1 confirms the empty space, since the priority of the rear sensor is the highest, the cart robot C2 immediately moves to the empty space.

On the other hand, when the right sensor of the cart robot C3 in the right direction R2 confirms the empty space, since the priority of the right sensor is the second highest, the cart robot C3 waits for a certain period of time and then confirms the empty space again. After the certain period of time, the cart robot C2 moves backward as shown in FIG. 13(57), and then, the right sensor of the cart robot C3 in the right direction R2 senses the cart robot C2. Thus, the cart robot C3 determines that there is no empty space and does not move.

On the other hand, in FIG. 13(57), a right sensor of the cart robot C4 in the right direction R2 confirms that an empty space occurs. Similarly, the cart robot C4, which confirms that a corresponding space is still empty after a certain period of time, moves to the right as shown in FIG. 13(58).

When the above-described embodiment is applied, the cart robot may automatically enter a parking state in a space to which the cart robot in a following mode is not allowed to move. In particular, a large space of a supermarket, an airport, or the like may be divided into a space into which a cart robot is allowed to enter and a space into which the robot is not allowed to enter. When a user enters such a space, the cart robot 100 may automatically recognize a situation without a user having to control the transmission module 500.

In addition, when the transmission module 500 includes the tag 530 and a conventionally used anti-theft gate based on an RF tag is used without any change, the transmission module 500 may sense a movement restricted area.

That is, an RF tag disposed in the transmission module 500 may check whether a user has passed through a gate installed in the movement restricted area and may transmit checked matters to the cart robot 100.

When the above-described embodiment is applied, the cart robot 100 and the transmission module 500 may check whether the cart robot 100 is allowed to enter. This provides convenience for the cart robot 100 to automatically park in an area into which the user is not allowed to enter by carrying the cart robot 100.

In addition, the cart robot 100 may check a movement prohibited area without a separate map. Furthermore, in a parking state or a process in which the cart robot 100 moves a parking area, the cart robot 100 may monitor the accommodation part 110 in a security mode and may store articles in the accommodation part 110.

Figure 14:
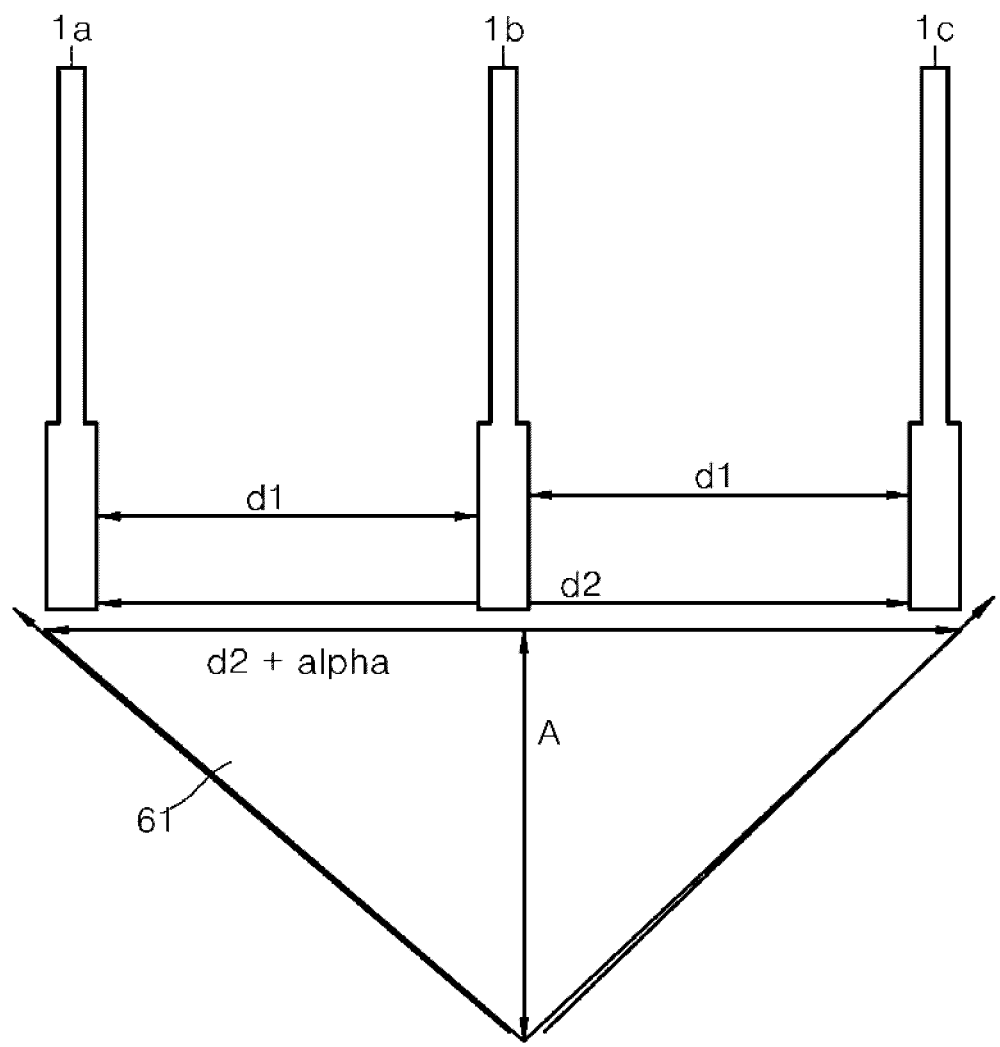
FIG. 14 illustrates a process in which the cart robot checks a neutral area in a movement prohibited area according to an embodiment of the present invention.

FIG. 14 illustrates a process in which the cart robot checks a neutral area in a movement prohibited area according to an embodiment of the present invention.

A plurality of gates may be disposed in the movement prohibited area such that one user passes therebetween. FIG. 14 illustrates a state in which three gates 1a, 1b, and 1c are provided. A distance between the gates is d1, and a distance between the gates 1a and 1c at both ends is d2.

Therefore, the cart robot 100 may set a triangle with a base d2+alpha and a height as a neutral area 61, wherein the base d2+alpha corresponds to the sum of an interval d2 between the gates at both ends and an extra distance alpha and the height corresponds to a distance A sensed when the transmission module 500 passes between the gates.

In addition, a process will be described in which the cart robot 100 checks a movement prohibited area and a parking area using the camera sensor 260. The process will be described with reference to FIG. 15.

Figure 15:
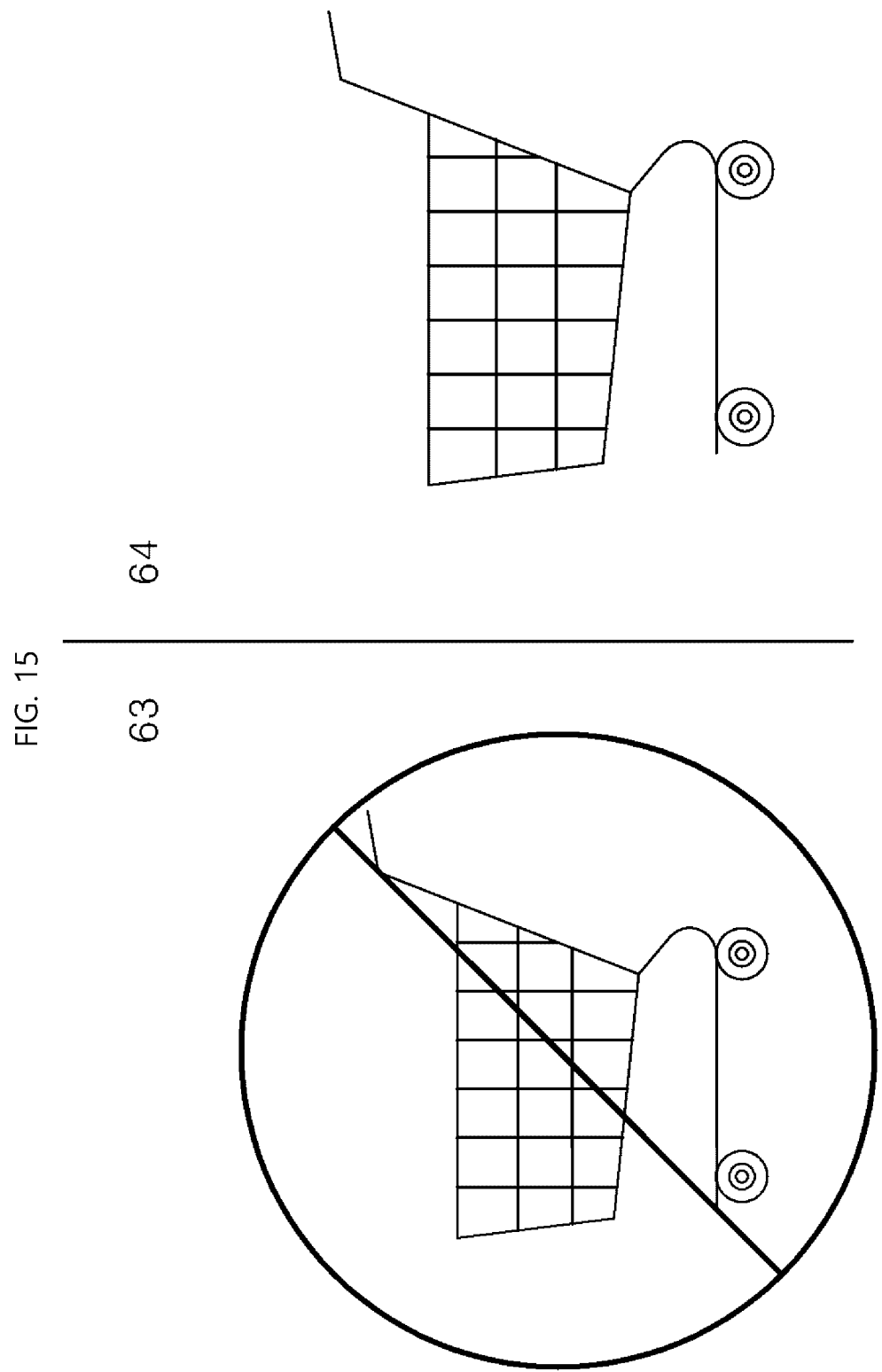
FIG. 15 illustrates a process in which the cart robot senses an image of a wall and identifies an area according to an embodiment of the present invention.

FIG. 15 illustrates a process in which the cart robot senses an image of a wall and identifies an area according to an embodiment of the present invention.

FIG. 15(63) is an image for notifying that the cart robot is not allowed to enter. This image may be disposed on a wall or floor so that the cart robot 100 may check the image using the camera sensor 260 while moving. In this case, the cart robot 100 may check movement of the transmission module and the presence or absence of gates and may determine a movement prohibited area.

FIG. 15(64) is an image for notifying an area in which the cart robot is allowed to park. While the cart robot 100 moves to a wall for parking, when the cart robot 100 checks an image in which a cart is arranged, the cart robot determines a corresponding area as a parking area.

In addition, the images of FIG. 15(64) may be repeatedly provided as long as the cart robot may be parked so that the cart robot may check the images and be parked.

In particular, the cart robot may store a plurality of images of a movement restricted area and a parking area. When an image of a periphery captured while the cart robot moves is the same or similar to the previously stored image of the movement restricted area, the cart robot may determine the periphery as a parking area.

Thus, the controller 250 or an artificial intelligence (AI) module 255 of the cart robot 100 may learn and process the image and may determine whether the periphery is the movement restricted area.

In an embodiment of the present specification, the cart robot 100 may determine a movement restricted area and a parking area using the camera sensor 260 and may perform a parking mode based on the determined movement restriction area and parking area. To this end, in order to identify features of a corresponding area in a captured image, the AI module 255 may compare the captured image with an existing image of a movement restricted area or a parking area and may calculate accuracy information on the movement restricted area or the parking area. The controller 250 may determine whether to maintain a following mode or enter a parking mode based on the calculated accuracy information.

The term "AI" means machine intelligence or a field of researching a methodology of making the AI. The term "machine learning" means a field of researching a methodology of defining and solving various problems dealt in an AI field. The machine learning is also defined as an algorithm that improves performance of any operation through a steady experience.

An artificial neural network (ANN) is a model used in the machine learning. The ANN may include artificial neurons (nodes) that constitute a network by coupling synapses and may mean an overall model having an ability to solve problems. The ANN may be defined through a connection pattern between neurons of different layers, a learning process of updating model parameters, and an activation function for generating an output value.

The ANN may include an input layer and an output layer and may optionally include one or more hidden layers. Each layer may include one or more neurons, and the ANN may include a synapse that connects the neurons. In the ANN, each neuron may output input signals input through the synapse, weightings, and function values of an activation function with respect to deflection.

The term "model parameter" means a parameter determined through learning and includes a weighting of synaptic connection and deflection of neurons. The term "hyperparameter" means a parameter that should be set in a machine learning algorithm before learning and includes a learning rate, a repetition number, a mini-batch size, and an initialization function.

A learning purpose of learning of the ANN may be considered to determine model parameters that minimize a loss function. The loss function may be used as an index for determining optimal model parameters in a learning process of the ANN.

The machine learning may be classified into supervised learning, unsupervised learning, and reinforcement learning according to a learning method.

The term "supervised learning" may mean a method of training the ANN in a state in which a label with respect to learning data is given. The term "label" may mean a right answer (or a result value) that should be deduced by the ANN when the learning data is input to the ANN. The term "unsupervised learning" may mean a method of training the ANN in a state in which a label is not given with respect to learning data. The term "reinforcement learning" may mean a learning method of training an agent defined in any environment so as to take an action of maximizing a cumulative reward in each state or select order of actions.

Machine learning implemented through a deep neural network (DNN) including a plurality of hidden layers among ANNs is also referred to as deep learning. The deep learning is a portion of the machine learning. Hereinafter, the term "machine learning" is used to include the meaning of the term "deep learning."

In the cart robot 100, the above-described AI module 255, which is a sub-component of the controller 250, may perform an AI function. The AI module 255 in the controller 250 may be configured with software or hardware.

In this case, the communicator 280 of the cart robot 100 may transmit and receive data to and from external devices such as a robot which provides another function and an AI server 700 to be described with reference to FIG. 9 using wired or wireless communication technology. For example, the communicator 280 may transmit and receive sensor information, user input, a learning model, and a control signal to and from the external devices.

In this case, the communication technology used by the communicator 280 may include global system for mobile communication (GSM), code division multiple access (CDMA), long term evolution (LTE), fifth generation (5G) wireless communication, a wireless local area network (WLAN), Wi-Fi, Bluetooth, radio frequency identification (RFID), infrared data association (IrDA), ZigBee, and near field communication (NFC).

The interface 230 may acquire a variety of data.

In this case, the interface 230 may include a camera for inputting a video signal, a microphone for receiving an audio signal, and a user inputter for receiving information from a user. Here, pieces of information acquired by the obstacle sensor 220, the camera sensor 260, and the microphone refer to sensing data, sensor information, and the like.

The interface 230 and various sensors 220 and 260 and wheel encoders of the movement unit 190 may acquire input date and the like to be used when output is obtained using a learning model and learning data for the learning model. The above-described components may acquire raw input data. In this case, the controller 250 or the AI module may extract input features by preprocessing the input data.

The AI module 255 may train a model including ANNs using learning data. Here, a trained ANN may be referred to as a learning model. The learning model may be used to deduce a result value with respect to new input data rather than learning data, and the deduced value may be used as a basis for determining whether the cart robot 100 performs any action.

In this case, the AI module 255 may perform AI processing together with a learning processor 740 of the AI server 700.

Here, the AI module 255 may be integrated in the cart robot 100 or may include an implemented memory. Alternatively, the AI module 255 may be implemented using a separate memory, an external memory coupled to the cart robot 100, or a memory maintained in an external device.

The cart robot 100 may acquire at least one of internal information of the cart robot 100, surrounding environment information of the cart robot 100, and user information using various sensors.

In this case, the sensors included in the cart robot 100 include a proximity sensor, an illuminance sensor, an acceleration sensor, a magnetic sensor, a gyro sensor, an inertial sensor, an RGB sensor, an infrared ray (IR) sensor, a fingerprint recognition sensor, an ultrasonic sensor, an optical sensor, a microphone, a LiDAR sensor, the obstacle sensor 220, the camera sensor 260, and a radar.

In addition, the above-described interface 230 may generate output related to visual, acoustic, or tactile senses.

In this case, the interface 230 may include a display configured to output visual information, a speaker configured to output auditory information, and a haptic module configured to output tactile information.

A memory embedded in the cart robot 100 may store data for supporting various functions of the cart robot 100. For example, the memory may store input data, learning data, a learning model, a learning history, and the like acquired by various sensors embedded in the cart robot 100, the interface 230, and the like.

The controller 250 may determine one or more executable operations of the cart robot 100 based on information determined or generated using a data analysis algorithm or a machine learning algorithm. The controller 250 may control the components of the cart robot 100 to perform the determined operations.

To this end, the controller 250 may request, search for, receive, or use data in the AI module or the memory and may control the components of the cart robot 100 to perform an operation being estimated or an operation being determined to be desirable among the one or more executable operations.

In this case, when an external device needs to be connected to perform the determined operations, the controller 250 may generate a control signal for controlling the external device and may transmit the generated control signal to the external device.

The controller 250 may acquire intention information corresponding to user input and may determine requirements of a user based on the acquired intention information.

In this case, the controller 250 may acquire the intention information corresponding to the user input using at least one of a speech-to-text (STT) engine for converting voice input into a string or a natural language processing (NLP) engine for acquiring intention information of a natural language.

In this case, at least a portion of at least one of the STT engine or the NLP engine may include an ANN trained according to a machine learning algorithm. At least one of the STT engine and the NLP engine may be trained by the AI module, the learning processor 740 of the AI server 700, or by distributed processing thereof The controller 250 may collect history information including operations of the cart robot 100 and user feedback on the operations and may store the collected history information in the memory or the AI module or transmit the collected history information to an external device such as the AI server 700. The collected history information may be used to update a learning model.

The controller 250 may control at least some of the components of the cart robot 100 to execute an application program stored in the memory 170. Furthermore, the controller 250 may combine and operate at least two of the components included in the cart robot 100 to execute the application program.

Alternatively, a separate AI server communicating with the cart robot 100 may be provided and may process information provided by the cart robot 100.

Figure 16:
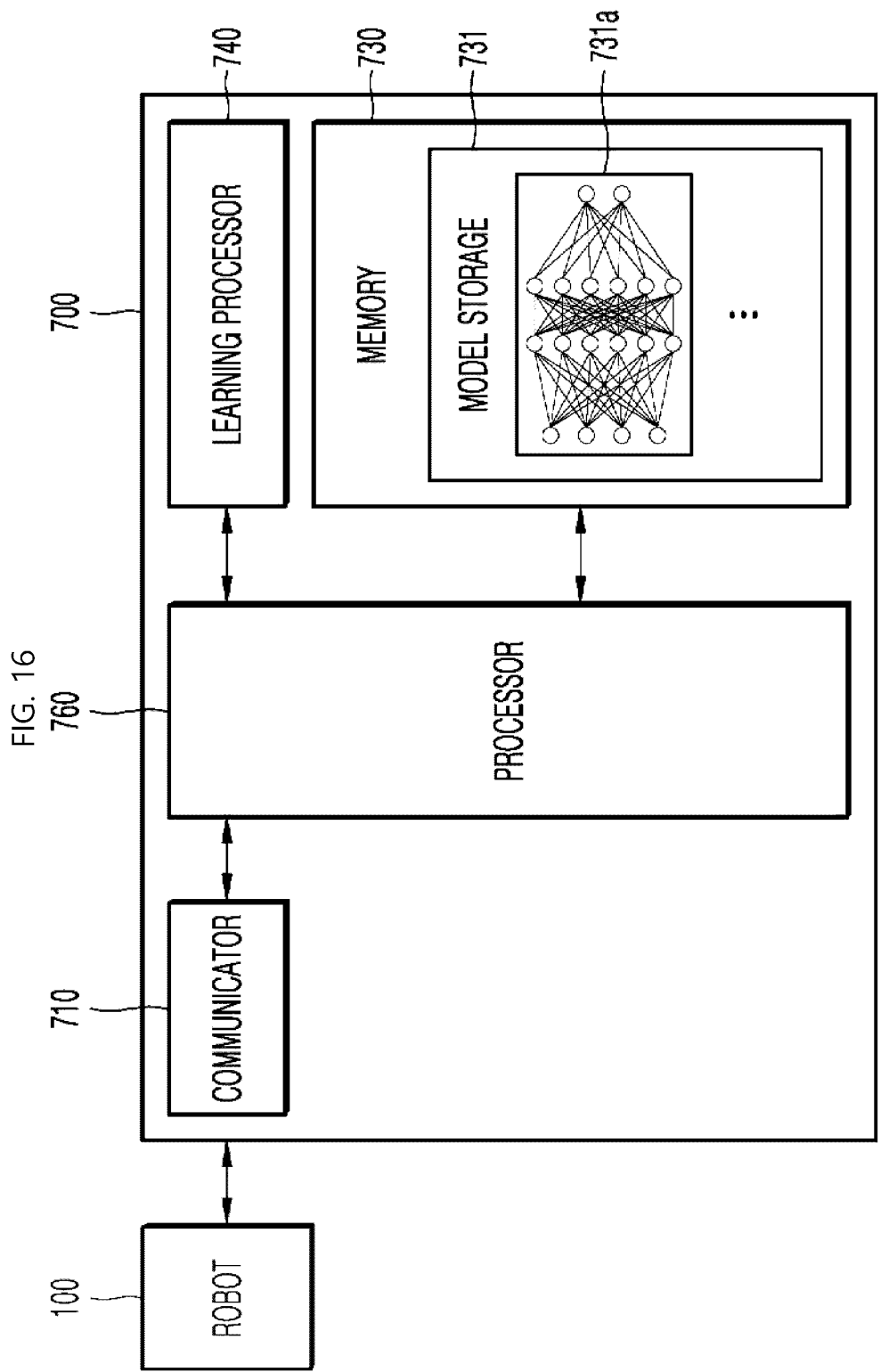
FIG. 16 illustrates a configuration of an artificial intelligence (AI) server according to the embodiment of the present invention.

FIG. 16 illustrates a configuration of the AI server according to the embodiment of the present invention.

The term "AI server," that is, the AI server 700, may mean a device which trains an ANN using a machine learning algorithm or uses the trained ANN. Here, the AI server 700 may include a plurality of servers to perform distributed processing or may be defined as a 5G network. In this case, the AI server 700 may be included as a part of the AI device such as cart robot 100 and may perform at least a portion of the AI processing together.

The AI server 700 may include a communicator 710, a memory 730, the learning processor 740, a processor 760, and the like.

The communicator 710 may transmit and receive data to and from an external device such as the cart robot 100 or the like.

The memory 730 may include a model storage 731. The model storage 731 may store a model (or an ANN 731a) which is being trained or is trained through the learning processor 740.

The learning processor 740 may train the ANN 731a using learning data. A learning model may be used in a state of being mounted in the AI server 700 of an ANN or may be used by being mounted in an external device such as the cart robot 100 or the like.

The learning model may be implemented in hardware, software, or a combination of hardware and software. When a portion or all of the learning model is implemented in software, one or more instructions that constitute the learning model may be stored in the memory 730.

The processor 760 may deduce a result value with respect to new input data using the learning model and generate a response or a control command based on the deduced result value.

In particular, in the present specification, the AI module 255 or the AI server 700 may output information on a space with respect to an input image. For example, when an image, which is obtained by photographing a space in which the cart robot travels, is input to the AI module 255 or the AI server 700, the AI module 255 or the AI server 700 analyzes the image to generate description data on the image.

The description data describes a space within an image and includes an explanation data such as a "movement restricted area" or a "cart parking area". The controller 250 may select a parking mode or a following mode using output information.

FIG. 17 illustrates a process in which the ANN module generates description data on an image after the image is acquired according to an embodiment of the present invention.

When the camera sensor 260 acquires an image (S71), the controller 250 performs a feature extraction from the image and calculates a feature vector (S72).

The AI module 255 of the controller 250 may use deep learning which is a kind of machine learning. In such a process, the controller 250 may extract features using a learning network which is a deep learning-based ANN.

Deep learning refers to learning down to a deep level at a multi-level based on data. The deep learning may represent a set of machine learning algorithms that extract key data from multiple data as levels are elevated.

A deep learning structure may include an ANN. For example, the deep learning structure may be composed of a DNN such as a convolutional neural network (CNN), a recurrent neural network (RNN), a deep belief network (DBN), or the like.

In addition, the ANN may include an input layer, a hidden layer, and an output layer. Each layer includes a plurality of nodes and each layer is connected to a layer subsequent thereto. The nodes between adjacent layers may be connected to each other with a weight.

The controller 250 may extract feature components from an image and may construct the components into a single vector.

Operation S72 may be performed by an encoder constituting the controller 250. A decoder receives a feature vector extracted by the encoder and converts the received feature vector into a description (S73). The decoder generates an image description for describing the image acquired in operation S71 using the converted description (S74).

That is, the decoder receives the feature vector and generates the image description necessary to analyze features of a space in the image.

The controller 250 extracts spatial feature information from the image description (S75). When it is confirmed that the spatial feature information is related to a movement restricted area when the cart robot 100 is in a following mode or when it is confirmed that a nearby region, in which the cart robot 100 moves, in a parking mode is a parking area, the controller 250 controls moving or parking of the cart robot 100 (S76).

The RNN, which is an example of a learning network constituting the AI module 255, may be widely used for natural language processing or the like and may be effective for processing time-series data changing over time, which may construct an ANN structure by stacking layers at each moment.

The DBN, which is an example of a learning network constituting the AI module 255, is a deep learning structure formed by stacking multiple layers of a restricted Boltzmann machine (RBM) which is a deep learning technique. When RBM learning is repeated to reach a certain number of layers, a DBN having a corresponding number of layers may be formed.

The CNN, which is an example of a learning network constituting the AI module 255, is particularly widely used in a field of object recognition. The CNN is a model that simulates a person's brain function based on the assumption that a person recognizes an object by extracting basic features of the object and subsequently performs complicated calculations in the brain.

In an embodiment, the encoder of the controller 250 may use the CNN among neural networks based on machine learning.

In addition, in an embodiment, the decoder of the controller 250 may use the RNN or a long short-term memory model (LSTM) among the neural networks based on the machine learning.

The controller 150 may calculate feature information of a user using a description of the image calculated by the decoder.

A process of FIG. 17 shows an embodiment in which the AI module 255 outputs results of analyzing an arrangement of gates and pictograms and characters disposed on a wall of the space included in the image and the cart robot moves or parks using the analysis results. Similarly, when a plurality of cart robots are parked around the cart robot 100 while the cart robot 100 moves, the AI module 255 may determine that there is a movement restricted area around the cart robot 100.

In summary, the camera sensor 260 captures an image of a periphery, and the controller 250 inputs the captured image to the AI module 255. The AI module 255 compares or analyzes the input image to generate description information.

The controller 250 determines a movement restricted area or a parking area around the cart robot 100 using the description information output by the AI module 255.

When the embodiments of the present invention are applied, a cart robot can track movement of a user and check whether the user has entered a movement restricted area.

When the embodiments of the present invention are applied, a cart robot can check whether the user moves based on a signal of a transmission module passing between RF gates installed for theft prevention, and the cart robot can enter a parking mode according to checking results.

When the embodiments of the present invention are applied, a cart robot can end a following mode without a separate control of a user in a movement restricted area, can move to a nearby parking area, and can be temporarily parked in the nearby parking area, thereby reducing complexity of a space and improving user convenience.

It should be noted that effects of the present invention are not limited to those described above and other effects will be apparent to those skilled in the art from the configurations of the present invention.

Although all components configuring the embodiments of the present invention have been described to be combined as one unit or to operate as a combination thereof, the present invention is not necessarily limited to the embodiments. That is, within the scope of the present invention, all components may be selectively combined into one or more thereof to operate in combination. In addition, although each of the components may be implemented as independent hardware, some or all of the components may be selectively combined with each other so that they can be implemented as a computer program having program modules for executing some or all of the functions combined in one or more pieces of hardware. Codes and code segments forming the computer program can be easily conceived by an ordinarily skilled person in the technical field of the present invention. Such a computer program may implement the embodiments of the present invention by being stored in a computer readable storage medium and being read and executed by a computer. A magnetic recording medium, an optical recording medium, a semiconductor recording element, or the like may be employed as a storage medium of the computer program. In addition, a computer program embodying the embodiments of the present invention includes a program module that is transmitted in real time through an external device.

As described above, although the embodiments of the present invention have been mainly described, various alterations or modifications may be made by persons having ordinary skills in the art. Therefore, such alterations and modifications can be said to belong to the present invention as long as they do not depart from the scope of the present invention.

What is claimed is:

1. A cart robot which controls movement thereof in a movement restricted area, the cart robot comprising:
an obstacle sensor configured to sense an obstacle disposed around the cart robot;
a positioning sensor configured to receive a signal from a transceiver;
a motor configured to move the cart robot; and
a controller configured to control the motor to park the cart robot around the movement restricted area when the positioning sensor receives data notifying that the cart robot enters the movement restricted area from the transceiver,
wherein the controller sets a first area using an entry width of the movement restricted area and a distance to the movement restricted area, and
when the transceiver is in the first area, the positioning sensor measures a distance to the transceiver and the controller stops the cart robot.

2. The cart robot of claim 1, wherein the controller sets a triangle as the first area, wherein the triangle has one point corresponding to a current position of the cart robot and two points corresponding to both ends of the entry width of the movement restricted area.

3. The cart robot of claim 1, wherein the positioning sensor searches for a parking beacon disposed around the movement restricted area, and
the controller calculates a distance between the parking beacon and the cart robot and moves the cart robot to the parking beacon to park the cart robot.

4. The cart robot of claim 1, wherein the controller searches for a wall disposed nearby using the obstacle sensor and moves the cart robot to the searched wall to park the cart robot.

5. The cart robot of claim 1, further comprising a camera sensor configured to photograph a periphery of the cart robot and an artificial intelligence processor configured to compare or analyze an image to generate description information,
wherein the camera sensor captures an image of the periphery of the cart robot, and
the controller inputs the captured image to the artificial intelligence processor and then determines a movement restricted area or a parking area around the cart robot using the description information output by the artificial intelligence processor.

6. The cart robot of claim 1, wherein, while the cart robot is parked, the controller maintains a distance to an object in front, rear, left, or right of the cart robot at a preset distance or more.

7. The cart robot of claim 1, wherein the obstacle sensor measures a distance to a nearby cart robot or wall after the parking, and
when the obstacle sensor senses an empty space occurring after the nearby cart robot moves, the controller sets waiting times differently according to sensing directions of the obstacle sensor, and then, when the empty space is maintained, the controller moves the cart robot to the empty space.

8. The cart robot of claim 1, further comprising a first sensor configured to sense movement of an object in the cart robot,
wherein, while the cart robot is parked or after the cart robot is parked, the controller controls the first sensor to operate a security mode in which an inside of the cart robot is monitored.

9. The cart robot of claim 1, wherein, after the cart robot is parked, when the positioning sensor receives the data notifying that the cart robot enters the movement restricted area from the transceiver, the controller controls the positioning sensor to track a position of the transceiver and move the cart robot to follow the transceiver.

10. A method of controlling a cart robot in a movement restricted area, the method comprising:
receiving, by a positioning sensor of a cart robot, data notifying that the cart robot enters a movement restricted area from a transceiver;
searching for, by a controller of the cart robot, a parking area around the movement restricted area;
moving, by the controller, the cart robot to the searched parking area to park the cart robot;
setting, by the controller, a first area using an entry width of the movement restricted area and a distance to the movement restricted area;
when the transceiver is in the first area, measuring, by the positioning sensor, a distance to the transceiver; and
stopping, by the controller, the cart robot.

11. The method of claim 10, wherein, in the setting, the controller sets a triangle as the first area, wherein the triangle has one point corresponding to a current position of the cart robot and two points corresponding to both ends of the entry width of the movement restricted area.

12. The method of claim 10, further comprising searching for, by the positioning sensor, a parking beacon disposed around the movement restricted area, and
calculating, by the controller, a distance between the parking beacon and the cart robot and moving the cart robot to the parking beacon to park the cart robot.

13. The method of claim 10, further comprising searching for, by the controller, a wall disposed nearby using an obstacle sensor, and
moving, by the controller, the cart robot to the searched wall to park the cart robot.

14. The method of claim 10, wherein the cart robot further includes a camera sensor configured to photograph a periphery of the cart robot and an artificial intelligence processor configured to compare or analyze an image to generate description information, and the method further comprises:
photographing, by the camera sensor, the periphery of the cart robot to generate an image;
inputting, by the controller, the generated image to the artificial intelligence processor;
comparing or analyzing, by the artificial intelligence processor, the image to generate and output description information; and
determining, by the controller, a movement restricted area or a parking area around the cart robot using the description information.

15. The method of claim 10, further comprising:
while the cart robot is parked, maintaining, by the controller, a distance to an object front, rear, left, or right of the cart robot at a preset distance or more.

16. The method of claim 10, further comprising:
measuring, by an obstacle sensor, a distance to a nearby cart robot or wall after the parking;
sensing, by the obstacle sensor, an empty space occurring after the nearby cart robot moves; and
setting, by the controller, waiting times differently according to sensing directions of the obstacle sensor and then, when the empty space is maintained, moving the cart robot to the empty space.

17. The method of claim 10, wherein the cart robot further includes a first sensor configured to sense movement of an object in the cart robot, and
the method further comprises, while the cart robot is parked or after the cart robot is parked, controlling, by the controller, the first sensor to operate a security mode in which an inside of the cart robot is monitored.

18. The method of claim 10, further comprising:
after the cart robot is parked, receiving, by the positioning sensor, the data notifying that the cart robot enters the movement restricted area from the transceiver; and
controlling, by the controller, the positioning sensor to track a position of the transceiver and moving the cart robot to follow the transceiver.

19. A cart robot which controls movement thereof in a movement restricted area, the cart robot comprising:
an obstacle sensor configured to sense an obstacle disposed around the cart robot;
a positioning sensor configured to receive a signal from a transceiver;
a motor configured to move the cart robot; and
a controller configured to control the motor to park the cart robot around the movement restricted area when the positioning sensor receives data notifying that the cart robot enters the movement restricted area from the transceiver,
wherein the obstacle sensor measures a distance to a nearby cart robot or wall after the parking, and
when the obstacle sensor senses an empty space occurring after the nearby cart robot moves, the controller sets waiting times differently according to sensing directions of the obstacle sensor, and then, when the empty space is maintained, the controller moves the cart robot to the empty space.

* * * * *